(12) United States Patent
Stein et al.

(10) Patent No.: US 6,680,013 B1
(45) Date of Patent: Jan. 20, 2004

(54) SYNTHESIS OF MACROPOROUS STRUCTURES

(75) Inventors: Andreas Stein, St. Paul, MN (US); Brian T. Holland, Chicago, IL (US); Christopher F. Blanford, Minneapolis, MN (US); Hongwei Yan, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/549,078

(22) Filed: Apr. 15, 2000

Related U.S. Application Data
(60) Provisional application No. 60/129,663, filed on Apr. 15, 1999.

(51) Int. Cl.⁷ ............................................. B29C 65/00
(52) U.S. Cl. ......................................... 264/44; 264/628
(58) Field of Search ................................... 264/44, 628

(56) References Cited

U.S. PATENT DOCUMENTS

| | | | | |
|---|---|---|---|---|
| 3,899,556 A | * | 8/1975 | Heide et al. | 264/44 |
| 5,399,535 A | * | 3/1995 | Whitman | 501/80 |
| 5,958,314 A | * | 9/1999 | Draenert | 264/42 |
| 5,968,366 A | * | 10/1999 | Deckman et al. | |

FOREIGN PATENT DOCUMENTS

| | | |
|---|---|---|
| DE | 44 03 509 | 8/1995 |
| JP | 4-187515 | 7/1992 |
| WO | WO 95/21053 | 8/1995 |

OTHER PUBLICATIONS

Stein, Andreas, "Soft Chemical Synthesis of Porous Materials Based on Cluster–Network Structures," NSF Award Abstract, Abstract No. 9701507 (abstract) [online]. National Science Foundation, Arlington, VA, project dates May 1, 1997–May 31, 2002 (estimated) [retrieved on Jun. 22, 2001]. Retrieved from the Internet: URL: http.www fastlane.nsf.gov/servlet/showaward?award=9701507, 2 pages.

Stein, Andreas "Soft Chemical Synthesis of Porous Materials Based on Cluster–Network Structures," NSF Grant No. 9701507 (abstract) [online]. National Science Foundation, Arlington, VA, May 1, 1997 to Apr. 30, 1999 FY:2001 [retrieved on Jun. 22, 2001]. Retrieved from: Dialog Information Services, FEDRIP Database, 1 page.

Ward, Michael D., "Materials Research Science and Engineering Center for Hybrid Materials," NSF Award Abstract, Abstract No. 9809364 (abstract) [online]. National Science Foundation, Arlington, VA, project dates Sep. 1, 1998–Feb. 23, 2003 (estimated) [retrieved on Jun. 22, 2001]. Retrieved from the Internet: URL: http.www fastlane.nsf.gov/servlet/showaward?award=9809364, 2 pages.

Abrams et al., "Probing Intrazeolite Space," *J. Incl. Phenom. Mol. Recog. Chem,* 21(1):1–46 (1995).

(List continued on next page.)

*Primary Examiner*—Christopher A. Fiorilla
(74) *Attorney, Agent, or Firm*—Mueting, Raasch & Gebhardt, P.A.

(57) ABSTRACT

The present application discloses a method of forming an inorganic macroporous material. In some embodiments, the method includes: providing a sample of organic polymer particles having a particle size distribution of no greater than about 10%; forming a colloidal crystal template of the sample of organic polymer particles, the colloidal crystal template including a plurality of organic polymer particles and interstitial spaces therebetween; adding an inorganic precursor composition including a noncolloidal inorganic precursor to the colloidal crystal template such that the precursor composition permeates the interstitial spaces between the organic polymer particles; converting the noncolloidal inorganic precursor to a hardened inorganic framework; and removing the colloidal crystal template from the hardened inorganic framework to form a macroporous material. Inorganic macroporous materials are also disclosed.

40 Claims, 17 Drawing Sheets

OTHER PUBLICATIONS

Antonietti et al., "Synthesis of Mesoporous Silica with Large Pores and Bimodal Pore Size Distribution by Templating of Polymer Latices," *Adv. Mater.*, *10*(2):154–159 (1998).

Attard et al., "Mesoporous Platinum Films from Lyotropic Liquid Crystalline Phases," *Science*, 278:838–840 (1997).

Beck et al., "A New Family of Mesoporous Molecular Sieves Prepared with Liquid Crystal Templates," *J. Am. Chem. Soc.*, *114*(27):10834–10843 (1992).

Bein, "Synthesis and Applications of Molecular Sieve Layers and Membranes," *Chem. Mater.*, *8*(8):1636–1653 (1996).

Blanford et al., "Synthesis of Highly Ordered Macroporous Minerals: Extension of the Synthetic Method to Other Metal Oxides and Organic–Inorganic Composites," MRS Symposium Nov. 30–Dec. 3, 1998, Boston; published in: *Mater. Res. Soc. Symp. Proc.*, 549:61–66 (1999).

Burkett et al., "Synthesis of hybrid inorganic–organic mesoporous silica by co–condensation of siloxane and organosiloxane precursors," *Chem Commun.*, 11:1367–1368 (1996).

Carlson et al., "Characterization of Optical Diffraction and Crystal Structure in Monodisperse Polystyrene Colloids," *Applied Spectroscopy*, *38*(3):297–304 (1984).

Corma et al., "Synthesis of MCM–41 with Different Pore Diameters without Addition of Auxiliary Organics," *Chem. Mater.*, *9*(10):2123–2126 (1997).

Corma et al., "Delaminated zeolite precursors as selective acidic catalysts," *Nature*, *396*(6709):353–356 (1998).

Davis et al., "Bacterial templating of ordered macrostructures in silica and silica–surfactant mesophases," *Nature*, *385*(6615):420–423 (1997).

Denkov et al., "Mechanism of Formation of Two–Dimensional Crystals from Latex Particles on Substrates," *Langmuir*, *8*(12):3183–3190 (1992).

Efremov, "Chapter 2: Periodic Colloid Structures," *Surface and Colloid Science*, vol. 8, Matijević, ed., John Wiley & Sons, New York, Title page, publication page, table of contents and pp. 85–192 (1976).

Fedie, *The Swelling of Highly Crosslinked, Submicron Polymer Particles*, PhD thesis, University of Minnesota, 162 pages (1996).

Flanigen, "Chapter 2: Structural Analysis by Infrared Spectroscopy," *Zeolite Chemistry and Catalysis, ACS Monograph 171*, Rabo, ed., American Chemical Society, Washington DC, Title page, publication page, and pp. 80–117 (1976).

Furusawa et al., "Direct Observation for the Structure of the Electrical Double Layer of Concentrated Monodisperse Latices," *J. Colloid Interface Sci.*, *93*(2):504–512 (1983).

Fyfe et al., "Ultra–high resolution $^{29}$Si MAS NMR spectra of highly siliceous zeolites," *Nature*, *326*(6110):281–283 (1987).

Goodwin et al., "The Preparation and Characterisation of Polymer Latices Formed in the Absence of Surface Active Agents," *Br. Polym. J.*, *5*(5):347–362 (1973).

Goodwin et al., "Control of particle size in the formation of polymer latices," *Br. Polym. J.*, *10*(3):173–180 (1978).

Holland et al., "Synthesis of Macroporous Minerals with Highly Ordered Three–Dimensional Arrays of Spheroidal Voids," *Science*, *281*(5376):538–540 (Jul. 24, 1998).

Holland et al., "Dual Templating of Macroporous Silicates with Zeolitic Microporous Frameworks," *J. Am. Chem. Soc.*, *121*(17):4308–4309 (May 5, 1999; available on–line Apr. 16, 1999).

Holland et al., "Synthesis of Highly Ordered, Three–Dimensional, Macroporous Structures of Amorphous or Crystalline Inorganic Oxides, Phosphates, and Hybrid Composites," *Chem. Mater.*, *11*(3):795–805 (Mar. 15, 1999; available on–line Feb. 19, 1999).

Huo et al., "Organization of Organic Molecules with Inorganic Molecular Species into Nanocomposite Biphase Arrays," *Chem. Mater.*, *6*(8):1176–1191 (1994).

Huo et al., "Surfactant Control of Phases in the Synthesis of Mesoporous Silica–Based Materials," *Chem. Mater.*, *8*(5):1147–1160 (1996).

Imhof et al., "Ordered macroporous materials by emulsion templating," *Nature*, *389*(6654):948–951 (1997).

Imhof et al., "Uniform Macroporous Ceramics and Plastics by Emulsion Templating,"*Adv. Mater.*, *10*(9):697–700 (1998).

Jacobs et al., "Properties of the end members in the Pentasil–family of zeolites: characterization as adsorbents," *Zeolites*, *1*(3):161–168 (1981).

Joannopoulos et al., "Photonic crystals: putting a new twist on light," *Nature*, *386*(6621):143–149 (1997).

Johnson et al., "Ordered Mesoporous Polymers of Tunable Pore Size from Colloidal Silica Templates," *Science*, *283*(5404):963–965 (Feb. 12, 1999).

Judith et al., "Preparation of Photonic Crystals Made of Air Spheres in Titania," *Science*, *281*:802–804 (1998).

Khushalani et al., "Metamorphic Materials: Restructuring Siliceous Mesoporous Materials," *Adv. Mater.*, *7*(10):842–846 (1995).

Kloetstra et al., "Mesoporous material containing framework tectosilicate by pore–wall recrystallization," *Chem. Commun.*, 23:2281–2282 (1997).

Komarneni et al., "Novel honeycomb structure: a microporous ZSM–5 and macroporous mullite composite," *J. Mater. Chem.*, *8*(11):2327–2329 (1998).

Kresge et al., "Ordered mesoporous molecular sieves synthesized by a liquid–crystal template mechanism," *Nature*, *359*(6397):710–712 (1992).

Larsen et al., "Like–charge attractions in metastable colloidal crystallites," *Nature*, *385*(6613):230–233 (1997).

Meier et al., *Atlas of Zeolite Structure Types; 2$^{nd}$ revised ed.*, Butterworth's, Boston, Title page, publication page, and table of contents only, 3 pages (1987).

Míguez et al., "Evidence of FCC Crystallization of $SiO_2$ Nanospheres," *Langmuir*, *13*(23):6009–6011 (1997).

Monnier et al., "Cooperative Formation of Inorganic–Organic Interfaces in the Synthesis of Silicate Mesostructures," *Science*, *261*:1299–1303 (1993).

Nagase et al., "Thermal Dehydration and Decomposition Reactions of Bivalent Metal Oxalates in the Solid State," *Bull. Chem. Soc. Japan*, *48*(2):439–442 (1975).

Okubo, "Phase Transition between Liquid–like and Crystal––like Structures of Deionized Colloidal Suspensions," *J. Chem. Soc. Faraday Trans.*, *86*(16):2871–2876 (1990).

Ottewill, "Colloid Stability and Instability: "Order Disorder"," *Langmuir*, *5*(1):4–11 (1989).

Park et al., "Fabrication of Three–Dimensional Macroporous Membranes with Assemblies of Microspheres as Templates," *Chem. Mater.*, *10*(7):1745–1747 (1998).

Raman et al., "Template–Based Approaches to the Preparation of Amorphous, Nanoporous Silicas," *Chem. Mater.,* 8(8):1682–1701 (1996).

Rausch et al., "Morphology and Utilization of Smooth Hydrogen–Evolving Raney Nickel Cathode Coatings and Porous Sintered–Nickel Cathodes," *J. Electrochem. Soc.,* 143(9):2852–2862 (1996).

Roberts et al., "The antimony–antimony trioxide electrode and its use as a measure of acidity," *J. Am. Chem. Soc.,* 50:2125–2147 (1928).

Roy et al., "Hydroxyapatite formed from Coral Skeletal Carbonate by Hydrothermal Exchange," *Nature,* 247(5437):220–222 (1974).

Shimizu et al., "Direct Crystallization of Amorphous Silicates to Zeolites in Solid State," *Chem. Letters,* 5:403–404 (1996).

Smith, "Arsenic, Antimony and Bismuth," *Comprehensive Inorganic Chemistry*, vol. 2, Bailar et al., eds., Pergamon Press: Oxford, Title page, publication page, table of contents, and pp. 547–683 (1973).

Sun et al., "Synthesis of microporous transition–metal–oxide molecular sieves by a supramolecular templating mechanism," *Nature,* 389(6652):704–706 (1997).

Szostak, *Molecular Sieves: Principles of Synthesis and Identification*, Van Nostrand Reinhold, New York, Title page, publication page, and table of contents only, 5 pages (1989).

Tanev et al., "Titanium–containing mesoporous molecular sieves for catalytic oxidation of aromatic compounds," *Nature,* 368(6469):321–323 (1994).

Tomida et al., "Relation Between the Conditions of Preparation and the Polarization Characteristics of Spongy Raney Nickel Electrodes Used as Anodes for Fuel Cells," *J. Electrochem. Soc.,* 139(4):981–984 (1992).

van Blaaderen et al., "Template–directed colloidal crystallization," *Nature,* 385(6614):321–324 (1997).

Velev et al., "Porous silica via colloidal crystallization," *Nature,* 389(6650):447–448 (1997).

Velev et al., "Microstructured Porous Silica Obtained via Colloidal Crystal Templates," *Chem. Mater.,* 10(11):3597–3602 (1998).

Vlasov et al., "Synthesis of Photonic Crystals for Optical Wavelengths from Semiconductor Quantum Dots," *Adv. Mater.,* 11(2):165–169 (Feb., 1999).

Vos et al., "X–ray Diffraction of Photonic Colloidal Single Crystals," *Langmuir,* 13(23):6004–6008 (1997).

Wang, *Polymer Latex Particles—Preparation, Characterization, and Coating Patterns*, Ph.D. Thesis, University of Minnesota, 277 pages (1993).

Weber et al., "New Porous Biomaterials by Replication of Echinoderm Skeletal Microstructures," *Nature,* 233(5318):337–339 (1971).

Weber et al., "Replamineform: A New Process for Preparing Porous Ceramic, Metal, and Polymer Prosthetic Materials," *Science,* 176(4037):922–924 (1972).

Woodcock, "Entropy difference between the face–centred cubic and hexagonal close–packed crystal structures," *Nature,* 385(6612):141–143 (1997).

Yan et al., "A Chemical Synthesis of Periodic Macroporous NiO and Metallic Ni," *Adv. Mater.,* 11(12):1003–1006 (Aug., 1999).

Yan et al., "General Synthesis of Periodic Macroporous Solids by Templated Salt Precipitation and Chemical Conversion," *Chem. Mater.,* 12(4):1134–1141 (Apr. 17, 2000; available on line Mar. 17, 2000).

Yang et al., "Mesoporous Silica with Micrometer–Scale Designs," *Adv. Mater.,* 9(10):811–814 (1997).

Yang et al., "Generalized syntheses of large–pore mesoporous metal oxides with semicrystalline frameworks," *Nature,* 396(6707):152–155 (1998).

Yang et al., "Hierarchically Ordered Oxides," *Science,* 282(5397):2244–2246 (1998).

Zakhidov et al., "Carbon Structures with Three–Dimensional Periodicity at Optical Wavelengths," *Science,* 282:897–901 (1998).

Zhao et al., "Advances in Mesoporous Molecular Sieve MCM–41," *Ind. Eng. Chem. Res.,* 35(7):2075–2090 (1996).

Zhao et al., "Triblock Copolymer Syntheses of Mesoporous Silica with Periodic 50 to 300 Angstrom Pores," *Science,* 279:548–552 (1998).

Zou et al., "Model Filled Polymers. V. Synthesis of Crosslinked Monodisperse Polymethacrylate Beads," *J. Polym. Sci. Part A: Polym. Chem.,* 30(1):137–144 (1992).

\* cited by examiner

SYNTHESIS OF MACROPOROUS STRUCTURES

This application claims the benefit of U.S. Provisional Patent Application, Serial No. 60/129,663, filed Apr. 15, 1999, which is incorporated herein by reference.

STATEMENT OF GOVERNMENT RIGHTS

The present invention was made with the support of the National Science Foundation under Grant Nos. DMR-9701507 and 9809364 and the Department of Energy under Grant No. DOE/DE-FG02-93-ER14384. The government may have certain rights in the invention.

BACKGROUND

Porous solids have made a great impact in applications including catalysis, sorption, and separations. Advanced optoelectronics applications have been proposed that would benefit from a facile method of producing large quantities of porous materials in various compositions with high degrees of three dimensional order. For example, quantum electronics and optical communications require single-mode microcavities constructed from dielectric or walls materials with adjustable composition and multidimensional periodicity. So far, the fabrication of such structures with periodicity in three dimensions and feature sizes below 1 $\mu$m has remained an experimental challenge (Joannopoulos et al., *Nature*, 386:143–149 (1997)). Catalysis and large molecule separation processes would also benefit from more uniform porous supports that provide optimal flow and improved efficiencies.

The use of organic templates to control the structure of inorganic solids has proven very successful for designing porous materials with pore sizes ranging from angstroms to micrometers. In the case of silicates and aluminosilicates, the organic additives are molecular and lead to microporous (at least about 0.2 nm to about 2 nm pores) zeolitic structures. Larger mesopores have been obtained by using surfactant templates or emulsion droplets as templates (Kresge et al., *Nature*, 3:710–712 (1992); and Monnier et al., *Science*, 261:1299–1303 (1993)). In mesoporous solids (greater than about 2 nm to about 50 nm pores), structural order and control of pore size has been achieved by employing micellar templates of surfactant molecules as structure-directing agents in a cooperative assembly process between the organic and inorganic species used. Although these materials are not crystalline in nature, they typically possess an ordered arrangement of pores having a narrow distribution of pore sizes. The synthesis can thus be tailored to produce pore sizes between 2 nm and 10 nm in diameter. A large assortment of mesoporous metal oxides and inorganic/organic composites has become available through modifications of the surfactant-based synthesis (Huo et al., *Chem. Mater.*, 6:1176–1191 (1994); and Tanev et al., *Nature*, 368:321–323 (1994)). Micellar templates have also been used to create microporous materials with inorganic frameworks similar to their mesoporous counterparts (Sun et al., *Nature*, 389:704–706 (1997)).

Several techniques are currently under development to achieve even larger mesoporous (diameters up to 50 nm) and macroporous (diameters greater than about 50 nm) solids with relatively narrow pore-size distributions. For example, mesopore sizes can be increased by swelling surfactant aggregates with auxiliary organic molecules (Beck et al., *J. Am. Chem. Soc.*, 114:10834–10843 (1992)) by adjusting surfactant and co-cation concentrations (Corma et al., *Chem. Mater.*, 9:2123–2126 (1997)), or by postsynthesis treatment of the mesoporous sieve (Khushalani et al., *Adv. Mater.*, 7:842–846 (1995)). The condensation of a silicate network within a triblock copolymer structure and subsequent extraction of the polymer can result in periodic mesopores with 5–30 nm diameters. Macropores with diameters of a few hundred nanometers have recently been templated in inorganic solids by latex sphere dispersions in the presence of surfactants, and by oil/formamide emulsions (Imhof et al., *Nature*, 389:948–951 (1997)). Although these materials can have relatively narrow pore size distributions, their structural periodicity in three dimensions has been limited. Greater order has been achieved in macroporous thin silica films which were templated by surfactant-modified latex spheres deposited on a membrane as 10 $\mu$m-thick colloidal crystals (Velev et al., *Nature*, 389:447–448 (1997)). Others have described the synthesis of macroporous polyurethane membranes by a latex-sphere templating technique, although this involved the use of organic monomers or prepolymers to form the framework. Also, others have described the preparation of periodic macroporous carbon structures by silica sphere templating wherein the voids were filled using chemical vapor deposition or an organic resin that was calcined and converted to carbon.

Materials with bimodal pore systems are of considerable interest for applications in catalysis and separations, as they combine the benefits of each pore size regime (Davis et al., *Nature*, 385:420–423 (1997); and Yang et al., *Adv. Mater.*, 9:811–814 (1997)). Micropores in zeolites provide size- or shape-selectivity for guest molecules; channels in porous solids often impart the material with very high surface areas, which can increase host-guest interactions (Zhao et al., *Ind. Eng. Chem. Res.*, 35:2075–2090 (1996)). Bimodal pore structures involving zeolites are typically prepared by supporting zeolite crystallites on membranes (Bein, *Chem. Mater.*, 8:1636–1653 (1996)). Attempts to crystallize the walls of mesoporous MCM-41 has resulted in the formation of a material with increased catalytic activity; FTIR spectra revealed embryonic stages of tectosilicate formation, but powder X-ray diffraction (PXRD) patterns showed no crystalline features (Kloetstra et al., *Chem. Commun*, 23 2281–2282 (1997)).

A need exists for general methods that readily permit the formation of macroporous structures, preferably having three-dimensional ordered structures, with many possible compositions.

SUMMARY OF THE INVENTION

The present invention provides methods of forming an inorganic macroporous materials and materials formed therefrom. In one embodiment, a method involves: providing a sample of organic polymer particles; forming a colloidal crystal template of the sample of organic polymer particles, the colloidal crystal template comprising a plurality of organic polymer particles and interstitial spaces therebetween; adding an inorganic precursor composition comprising a noncolloidal inorganic precursor to the colloidal crystal template such that the precursor composition permeates the interstitial spaces between the organic polymer particles; converting the noncolloidal inorganic precursor to a hardened inorganic framework; and removing the colloidal crystal template from the hardened inorganic framework to form a macroporous material, preferably having an ordered, three-dimensional structure. Preferably, converting the non-colloidal inorganic precursor and removing the organic polymer particles occur in one step, which preferably involves calcination.

Typically, the organic polymer particles are relatively uniform in size, preferably having a particle size distribution of no greater than about 10%, and more preferably having a particle size distribution of no greater than about 5%. Preferably, the organic polymer particles are spheres. Preferred organic polymer particles are prepared from polystyrene, polymethyl methacrylate, or a fluorinated polymer. The particles can be ordered to form a colloidal crystal template by a variety of techniques, such as centrifugation, sedimentation, spin coating, evaporation, layer-by-layer growth, crystallization, or deposition in lithographic patterns. Preferably, after the colloidal crystal template is formed it is dried. This generally opens up the interstitial spaces and typically causes the particles to hold together better. If desired, the organic polymer particles can be fused together, such as by heating the particles.

The inorganic precursor composition can include one or more inorganic precursors, which can dissolved in a solvent, preferably water, an alcohol, or a mixture thereof As used herein, "a" or "an" refers to one or more, thereby encompassing mixtures, blends, etc. The inorganic precursor can be a low viscosity liquid.

The inorganic precursor is preferably an alkoxide or a salt. Typically, if it is an alkoxide, converting it to a hardened inorganic framework involves hydrolysis and condensation. If it is a salt, typically converting it to a hardened inorganic framework involves adding it to the colloidal crystal template in a solution and subsequently causing it to precipitate out of solution in the interstitial spaces. Precipitation can occur simply by drying (i.e., removing the solvent), which can form a film on the template as opposed to discrete particles of a precipitate, or by using anion exchange.

After the inorganic framework is formed, the organic polymer particles that form the colloidal crystal template are removed by extracting or calcining them, for example. Prior to or subsequent to this, the chemical composition of the framework can be altered if desired (e.g., a salt can be converted to an oxide, a metal oxide can be converted to a metal, and the like).

In a preferred method of the present invention, an inorganic macroporous material is prepared by: providing a sample of organic polymer particles having a particle size distribution of no greater than about 10%; forming a colloidal crystal template of the sample of organic polymer particles, the colloidal crystal template comprising a plurality of organic polymer particles and interstitial spaces therebetween; adding an inorganic precursor composition comprising an alkoxide to the colloidal crystal template in a manner to allow the inorganic precursor composition to permeate the interstitial spaces between the organic polymer particles; condensing the alkoxide to form a hardened inorganic framework; and removing the colloidal crystal template from the hardened inorganic framework to form a macroporous material.

In another preferred method of the present invention, an inorganic macroporous material is prepared by: providing a sample of organic polymer particles; forming a colloidal crystal template of the sample of organic polymer particles, the colloidal crystal template comprising a plurality of organic polymer particles and interstitial spaces therebetween; adding a salt solution to the colloidal crystal template in a manner to allow the salt solution to permeate the interstitial spaces between the organic polymer particles; precipitating the salt out of solution within the interstitial spaces; and removing the colloidal crystal template from the hardened inorganic framework to form a macroporous material. Preferably, the method further includes converting the precipitated salt to a hardened inorganic framework prior to removing the organic polymer particles.

Significantly, the methods of the present invention can be used to prepare a wide variety of macroporous materials. For example, zeolite analogues, such as a silicalite, which has a bimodal distribution of pore sizes, can be formed, as well as hybrid inorganic/organic materials, such as organic silicate.

If desired, particularly for the formation of bimodal structures (i.e., those with generally two types of pore sizes—macroporous and mesoporous or acroporous and microporous), a structure-directing agent and/or a surfactant can be used, which is preferably included in the inorganic precursor composition.

The present invention also provides novel macroporous materials. Although these materials are prepared using the methods described above, other methods can be envisioned to also produce such materials. For example, other templates could be used, other inorganic precursors could be used, etc.

In one embodiment, the present invention provides a macroporous zeolite analogue having a bimodal pore structure that includes micropores and substantially uniform macropores. A preferred such zeolite analogue is a silicalite.

In another embodiment, the present invention provides a macroporous material having a bimodal pore structure that includes mesopores and macropores, wherein the macropores are ordered. A preferred such material includes silica.

In yet another embodiment, the present invention provides a macroporous material that includes a metal or metal alloy framework and macropores having an average pore size of greater than about 50 nm and less than about 10 microns. Preferably, the macropores are ordered.

DETAILED DESCRIPTION OF PREFERRED EMBODIMENTS

Figure 1:
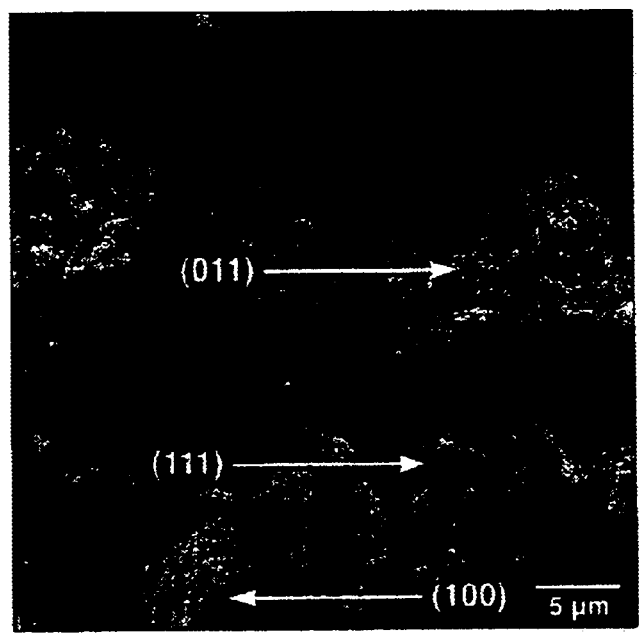
FIG. 1. SEM of small colloidal crystals composed of monodisperse latex spheres. These were used as templates for the inorganic composites. Exposed (100), (111), and (011) faces are labeled.

Synthesis of Macroporous Structures Using an Organic Polymer Template

The present invention provides organic polymer templating methods that permit formation of macroporous structures, and preferably three-dimensional ordered macroporous (3DOM) structures, of many compositions. The methods of the present invention are advantageous because they extend the compositional range of possible macroporous products to carbonates, phosphates, silicates, oxides and other chalcogenides (e.g., sulfides) of most metals in the periodic table. Significantly, the present invention provides a metal or metal alloy ordered macroporous material, and bimodal macroporous materials (e.g., macroporous/microporous materials, macroporous/mesoporous materials). Thus, the methods of the present invention are very versatile, much more so than conventional methods.

Significantly, the methods involve the use of inexpensive precursors, preferably those that are low viscosity liquids or compounds that are soluble in water, alcohols, or other solvents that are compatible with the organic polymer template. Preferred methods are based on templated precursor condensation or precipitation within the interstitial spaces of a template, subsequent chemical conversion of the precursors if necessary, and removal of the material forming the template. The resultant macroporous material includes a framework with voids (i.e., pores) and windows in the walls of the framework between the voids, thereby forming open channels between the voids.

Preferred synthetic parameters permit control over the phase and thicknesses of the walls, as well as interconnectivity between pores, of the macroporous material. Many of the novel materials produced offer distinct advantages over previously synthesized macroporous structures due to the remarkable three-dimensional periodicity and uniformity of macropores that are separated by tailorable dielectric walls. These features are requirements for new photonic crystals, and can be beneficial in catalysis or large-molecule separation processes by potentially improving mass transfer processes and efficiencies. Other anticipated applications for the new macroporous solids include uses as porous electrodes or electrolytes and thermal insulators.

The materials formed by the methods of the present invention have a macroporous structure. By this, it is meant that they have pores on the order of at least about 50 nanometers (nm) in size. The size of a pore is the largest dimension of the pore (typically, the diameter of a spherical pore). Significantly, and preferably, the macroporous structures formed by the methods of the present invention are uniform, and more preferably ordered. As used herein, a "uniform" macroporous material has macro-size pores that are substantially the same size (typically, the pore sizes vary by no greater than about 20%). An "ordered" macroporous material has at least 10 (and often up to 300 or more) close-packed voids in each of three dimensions. Certain embodiments of the present invention (e.g., the zeolitic analogues described below) have uniformly sized macropores, although the order is not as high as for some of the other materials of the present invention.

Also, significantly, the macroporous structures formed by the methods of the present invention can be made in a large range of sizes. That is, the methods are suitable for providing film-like articles as well as much thicker articles.

In a preferred embodiment of a method of the present invention, organic polymer particles are used in forming a template. Suitable particles are similar in size and shape. Preferably, they are spheres, although other shapes can be envisioned as long as they pack uniformly and leave interstitial spaces that can be filled with an inorganic precursor. Preferably, the particles have a particle size distribution of no greater than about 10% variation (e.g., the diameter of the spheres in a sample does not vary by more than about ±10%), and more preferably, no greater than about 5% variation. Preferably, the particle size (i.e., the largest dimension of the particles, e.g., diameter) of the particles is about 30 nm to several micrometers, and more preferably, about 100 nm to about 1000 nm.

A colloidal crystal template of a plurality of the organic polymer particles (preferably, spheres, more preferably, latex spheres, and most preferably, non-crosslinked latex spheres) with interstitial spaces between the spheres is then formed. This colloidal crystal template preferably is a close-packed array of particles, although this is not necessarily required. As used herein, a close-packed array is an array in which the particles are packed in the smallest volume possible without significantly distorting the shapes of the particles. The colloidal crystal template can include defects (e.g., point, line, plane defects), typically in a relatively small number, if desired. The formation of such a template can be done by a variety of methods, such as centrifugation, sedimentation, spin coating, evaporation methods, layer-by-layer growth, crystallization in capillaries, deposition in lithographic patterns, and the like.

Colloidal crystals of latex spheres in two and three dimensions (2D and 3D) are well known (R. H. Ottewill, *Langmuir,* 5:4–11 (1989); and T. J. Okubo, *J. Chem. Soc. Faraday Trans.,* 86:2871–2876 (1990)). They can be formed by slow sedimentation or by centrifugation of colloidal dispersions of particles, preferably spherical particles. During the formation of 2D crystals, the particles are ordered into colloidal crystal templates by attractive capillary forces (from the menisci formed around the particles) and by convective transport of particles toward the ordered regions (Denkov et al., *Langmuir,* 8, 3183–3190 (1992)). The crystallization of 3D colloidal templates is controlled by repulsive electrostatic forces between the particles. It is possible to induce crystallization from a suspension of particles by increasing the volume fraction of particles in the suspension (Larsen et al., *Nature,* 385:230–233 (1997)). The most ordered templates can be formed by slow sedimentation (Vos et al., *Langmuir* 13:6004–6008 (1997)), but faster ultracentrifugation can also result in the formation of periodic colloid structures (Furasawa et al., *J. Colloid Interface Sci,.* 93:504–512 (1971)). Centrifugation concentrates the disperse particles in a smaller volume, removing solvent from the space between particles, and often leading to close-packing (I. F. Efremov, *Surface and Colloid Science,* (Wiley Press, New York, 8:85–192 (1976)).

Sedimentation of monodisperse spheres into hexagonally close-packed layers can, in principle, result in hexagonally close packed (hcp), face-centered cubic (fcc) close packed, or random stacking in the third dimension. Body-centered cubic (bcc) phases have also been observed, especially at low concentrations of spheres in a suspension, in the presence of foreign salts, or at elevated temperatures (Carlson et al., *Applied Spectroscopy,* 38:297 304 (984)). Although the free energy differences between hcp and fcc are small, recent computer simulations have indicated that stacking of hard spheres in an fcc arrangement is the most stable arrangement (Woodcock, *Nature,* 385:141–143 (1997)). Experimentally, preferred fcc crystallization has been confirmed for crystals of monodisperse silica nanospheres (0.2–0.5 micrometer ($\mu$m) diameters) grown by natural sedimentation (Miguez et al., *Langmuir,* 13:6009–6011(1997)), and for crystals of latex spheres (0.24 $\mu$m diameter) grown by centrifugation (Denkov et al., *Langmuir,* 8:3183–3190 (1992)). An fcc arrangement in a set direction has also been forced by slow sedimentation of colloidal particles onto a patterned substrate (van Blaaderen et al., *Nature,* 385:321–324 (1997)).

Preferably, the colloidal crystal template of particles is dried and then placed in a container to maintain the array. This can be done, for example, by placing the spheres on filter paper in a Büchner funnel. Alternatively, the colloidal crystal template can also be annealed to fuse the spheres together without melting them, which would remove the interstitial spaces between the particles. This can be done by heating the particles to a temperature a few degrees above the glass transition temperature (Tg) of the particles for a few minutes (typically, not more than about 5–10 minutes) so that the shape of the particles is not significantly distorted. Alternatively, the particles can be fused together through chemical reaction if there are reactive sites at the surfaces of the particles.

One or more inorganic precursors are added to the colloidal crystal template (i.e., the template) in a manner that allows the precursor(s) to permeate the interstitial spaces between the particles, preferably, close-packed particles. The inorganic precursor can be a liquid, solid, or a gas. Typically, the precursor is a solid or liquid dissolved in one or more solvents in which one or more precursors are soluble. An inorganic precursor can be used without a solvent (i.e., neat) if it is a liquid with a sufficiently low viscosity that it can permeate the interstitial spaces. If necessary for the liquid precursors, a solvent can be used to adjust the viscosity and rate of penetration. If a solvent is used in an inorganic precursor composition, it can be water, an alcohol, or other organic solvent that is compatible with the organic polymer particles. By this it is meant that the solvent does not dissolve the particles, but sufficiently wets them to allow for penetration throughout the interstitial spaces. The inorganic precursor composition can be added to the template by soaking the template in the composition, filtering the composition through the template, etc. Penetration of the interstitial spaces can occur simply by gravity flow, capillary action, or through the use of pressure differentials, for example, as in vacuum-assisted percolation. Preferably, the solvent and the method of penetration are selected to allow the inorganic precursor composition to penetrate the template and substantially eliminate faults in the final structure as a result of non-wetted regions.

The inorganic precursor impregnated into the colloidal crystal template is then converted into a hardened inorganic framework around the organic polymer particles, thereby forming a composite material. This can occur through several steps and several mechanistic pathways, depending on the type of inorganic precursor. Preferably, the inorganic precursor condenses or precipitates out of solution. It is known that the use of a surfactant coated on the organic polymer particles can induce polymerization of the inorganic precursor; however, this is undesirable in the methods of the present invention as order of colloidal crystal template can be reduced by this.

In one embodiment, the inorganic precursor is an alkoxide. It will undergo hydrolysis and condensation reactions to produce an oxide and water (or alcohol), which can be further removed upon drying. This is referred to herein as a "sol-gel" process, and can optionally involve the incorporation of an acid or base catalyst (e.g., tetrapropyl ammonium hydroxide) into the inorganic precursor composition. This material can then be converted to the desired end-product by appropriate treatment methods.

Typically, in a sol-gel process, an alkoxide (M—OR)$_n$ undergoes hydrolysis (forming M(OH)$_x$(OR)$_{n-x}$), often acid- or base-catalyzed, and condensation (forming M—O—M bonds either through dehydration or dealcoholation) to form a sol that is then converted to a gel. A sol is a suspension or dispersion of discrete colloidal particles, whereas a gel is a polymeric solid containing a fluid component, which has an internal network structure such that both the solid and fluid components are highly dispersed. The gel can then be dried and calcined at an elevated temperature to form a more dense ceramic material in the framework. Typically, the conversion, including sol-gel formation and drying can occur at room temperature or upon the application of heat, e.g., a temperature of about 25° C. to about 1000° C., although this can depend on the precursor(s) used. The calcination is typically carried out at a temperature of about 300° C. to about 1000° C.

In another embodiment, the inorganic precursor is an inorganic salt, such as an acetate. The salt can be impregnated into the interstitial spaces in a solvent in which it is soluble and then precipitated out of solution by anion exchange. For example, an insoluble oxalate can be formed from a soluble acetate within the interstitial spaces of the colloidal crystal template by impregnating oxalic acid after an acetate salt has been impregnated into the template. The solvent of the initial soluble salt solution may or may not be removed prior to the addition of the precipitating solution. Alternatively, the soluble salt solution may simply be dried to leave the salt within the spaces. This is referred to herein also as "precipitating."

This salt can then be converted by appropriate chemical treatment, if desired. For example, a precipitated metal oxalate can be converted to metal oxide by heating in air or into a metal by heating in nitrogen or hydrogen. It is envisioned that there are applications for macroporous structures of salts as well. For example, photonic crystals are composed of salt networks, where the choice of salt determines the refractive index of the wall, which is an important parameter for the operation of a photonic crystal.

The organic polymer particles of the colloidal crystal template can be removed either simultaneously with the conversion process of the precursor or subsequent thereto. Typically, the template should not be removed until the material of the framework is in a sufficient state such that the macroporous structure does not collapse or significantly deteriorate with respect to pore size and shape, although some shrinkage is allowed. Template removal typically is achieved by either calcination or by extraction. Preferably, at least about 80% by weight, more preferably, at least about 95% by weight, and most preferably, at least about 98% by weight, of the organic polymer material is removed from the composite material. There may, however, be carbon residue remaining within the pores. For example, as much as 40% by weight carbon can remain after calcination of the template particles in a non-oxidizing atmosphere.

Calcination is typically carried out at a temperature of about 300° C. to about 1000° C., although this depends on the particles used and on the composition of the inorganic framework that is formed. Extraction is typically carried out by one or more organic solvents, such as a mixture of tetrahydrofuran and acetone with polystyrene. For hybrid inorganic/organic macroporous materials, extraction is often the preferred method because high temperatures can be avoided, which preserves the organic functionality.

Depending on the choice of template removal technique, different phases of an inorganic material can be formed. For example, macroporous aluminum oxide prepared by calcination at 450° C. contains amorphous alumina walls; however, when it is calcined at 1000° C. the walls are composed of crystalline cubic alumina. Thus, calcination can serve to convert the inorganic precursor to the inorganic material of the final product (e.g., an oxide from an alkoxide), remove the template particles, and cause phase changes in the inorganic material.

The preferred particles are spheres having a narrow size distribution, as discussed above. Suitable organic polymer particles have surface properties that allow for good penetration and wetting of the inorganic precursor. Also, suitable organic polymer particles can be removable after formation of the inorganic framework, preferably by calcination. Examples of preferred organic polymer particles include polystyrene spheres, polymethyl methacrylate spheres, and the like. Such particles are commercially available from sources such as Polysciences, Inc., Interfacial Dynamics Corp., and Duke Scientific Corp., or they can be produced by a variety of methods, such as an emulsifier-free emulsion process, as described in the Examples Section.

The surface of the organic polymer particles can be functionalized, for example, with charged groups such as carboxylate or amine groups, to improve the wetability if desired. For methods that require high processing temperatures, such as zeolite formation, which is discussed below, organic polymer particles that have a high melting point or glass transition temperature, such as a polyfluorinated polymer, may be desirable.

The inorganic precursors can be any of a wide variety of metal-containing or metalloid-containing inorganic compounds (preferably, noncolloidal materials) that are low viscosity liquids or are sufficiently soluble in water or an organic solvent such that a solution can be formed for use in penetrating the voids of a template. Preferably, the inorganic precursors are soluble in water or an alcohol. Preferably, the precursors are sufficiently soluble in a solvent to provide a concentration of at least about 0.5 Molar. It is highly desirable to use as little solvent as possible to reduce or eliminate any loss of order as a result of swelling of the organic polymer particles. It is also desirable to use as concentrated a precursor composition as possible to avoid the need for multiple steps to fill the interstitial spaces with the precursor. Such multiple filling steps can lead to holes in the walls of the macroporous structure. Furthermore, a more concentrated precursor composition can lead to stronger walls in the final macroporous structure that are more resistant to collapse.

It is also possible to control the thickness of each component in a framework by changing the dilution of the precursor (and thereby adjusting the optical and electronic properties of the nanoparticles). Thinner walls are typically obtained at higher dilutions.

Suitable inorganic precursors include metal alkoxides and metal salts (e.g., acetates). Examples include tetraethyl orthosilicate (i.e., tetraethoxysilane or TEOS), tetramethyl orthosilicate (i.e., tetramethoxysilane or TMOS), aluminum tri-sec-butoxide, aluminum isopropoxide, zirconium n-propoxide, vinyltriethyoxysilane, titanium ethoxide, antimony n-butoxide, iron ethoxide, cerium isopropoxide, yttrium isopropoxide, 2-cyanoethyltrimethoxysilane, nickel acetate, manganese acetate, cobalt acetate, magnesium acetate, zinc acetate, and mixtures thereof. Such precursors can be purchased from a variety of commercial sources such as Aldrich Chemical Co., Gelest, and United Chemicals.

Figure 21:
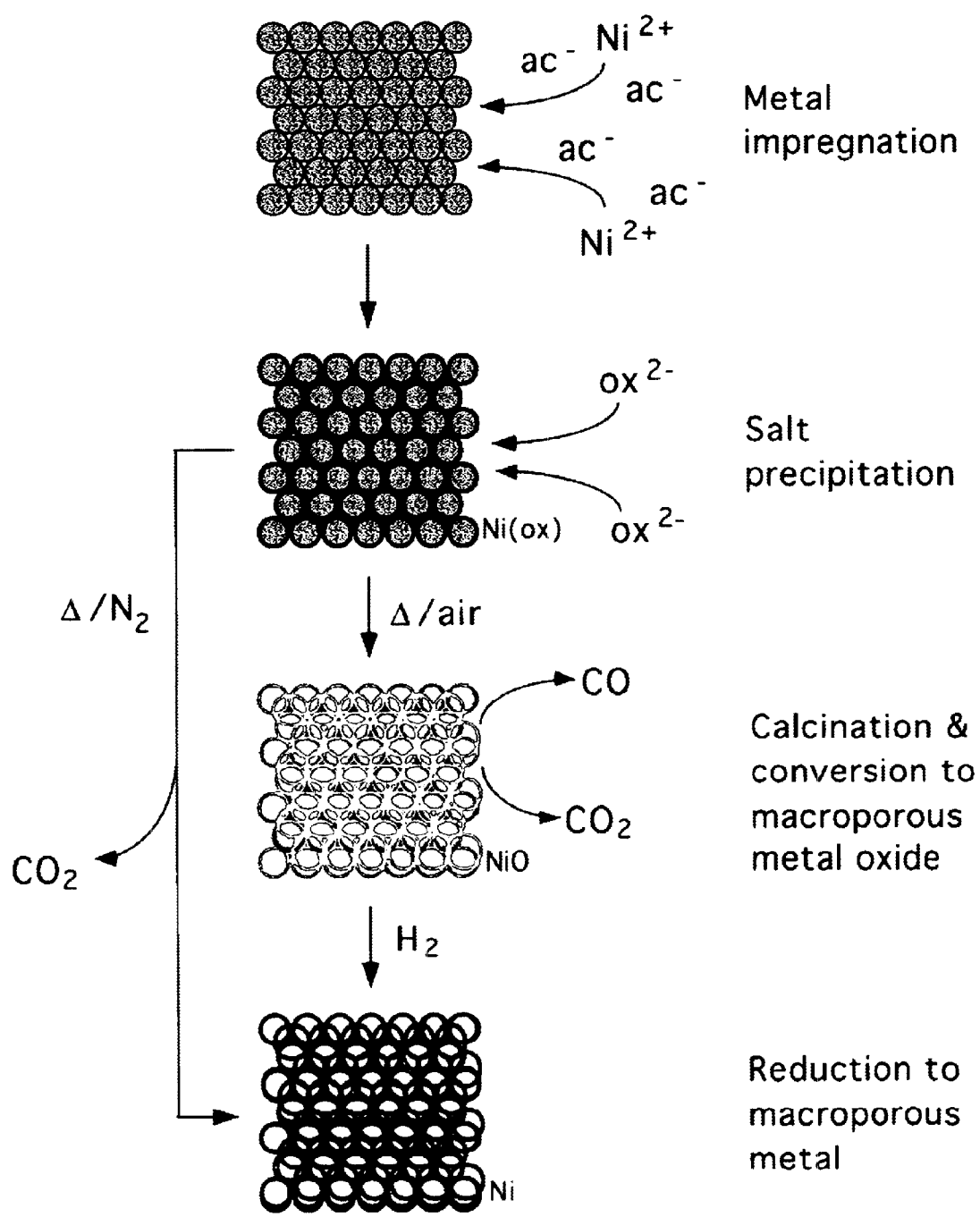
FIG. 21. Illustration of a scheme for preparation of macroporous metals by a precipitation/chemical method.

FIG. 21 illustrates in more detail how macroporous metals can be prepared by a precipitation/chemical conversion method. In a first step, a metal acetate, such as nickel acetate, is dissolved in a solvent and impregnated into a colloidal crystal template of organic polymer particles. After drying to remove the solvent, the impregnated colloidal crystal template is then further impregnated with a solution of oxalic acid to convert the metal acetate to a metal oxalate. The oxalate has lower solubility in the solvent of the oxalic acid solution and precipitates out in the void spaces. This precipitated salt can then be converted to a macroporous metal or metal oxide. For example, upon calcination in air of nickel oxalate, the framework formed is nickel oxide.

Alternatively, the metal oxalate can be converted to the metal upon heating the oxalate in the presence of nitrogen at elevated temperatures. The resultant compound that forms the framework can undergo further chemical transformation if desired. For example, a metal oxide can be converted to a metal upon reduction with hydrogen at elevated temperatures.

Also, macroporous mixtures of materials, such as metal/metal oxides, can be prepared using a method of the present invention. For example, macroporous nickel/nickel oxide (Ni/NiO) composite materials with variable ratios of the metal and the semiconducting oxide can be prepared by a method of the present invention. This can be done by partial reduction of a nickel oxide or nickel oxalate precursor.

The precipitation synthesis technique shown in FIG. 21 for templating macroporous metals is general, and it can be applied to a wide variety of elements, if sufficiently concentrated solutions containing the appropriate inorganic precursors can be prepared. Since oxalates of cobalt, lead, and cadmium decompose similarly to nickel oxalate, macroporous metals of a number of elements may be formed by analogous techniques. Certain other metal oxalates favor formation of oxides (e.g., Mg., Mn, Fe, and Zn), or carbonates (e.g., Ca, Sr, Ba) under decomposition, which can also be molded into macroporous structures by the method of the present invention. This method is also preferred over the use of alkoxide precursors because the salts are less expensive, more readily available for certain metals.

With mixed metal oxalate precursors it is also possible to prepare analogous metal alloys containing two or more metal components, such as a macroporous $Ni_xCo_{1-x}$ alloy (a solid solution) or a macroporous $Mn_3Co_7$ alloy (an intermetallic compound). Macroporous metals and metal alloys are of interest for high surface area electrodes, electrochemical capacitors, fuel cells, sensors, metallic photonic crystals, and in certain cases as magnetic materials.

Thus, the present invention provides a macroporous material that includes a metal or metal alloy framework and macropores having an average pore size of greater than about 50 nm and less than about 10 microns. Preferably, the macropores are ordered, as defined above.

The facile templating method of the present invention is significant because of its general applicability to a variety of inorganic and hybrid inorganic/organic macroporous materials. That is, the compositional range of possible macroporous products includes compounds of many metals in the periodic table, including compositions that are less accessible or more expensive by previous syntheses. Examples include oxides of Mg, Mn, Cr, Co, Ni, Zn, Ca, Si, Ti, Zr, Al, W, Fe, Sb, and mixed Zr/Y, aluminophosphates, and organically functionalized silicates. As used herein, a hybrid inorganic/organic material, such as organically functionalized silicate, can include organic functional groups (e.g., vinyl groups, thiol groups, and sulfonic acid groups) as part of the silicate network or as surface groups, for example. The functional groups can also be used for further functionalization if desired.

By appropriate modification and optimization of the templating procedures of the present invention, it will be possible to vary the pore size range significantly. With pore sizes of a few hundred nanometers, the macroporous metals and alloys fill a gap in the range of accessible pore sizes between microporous (Raney nickel) (Rausch et al., *J. Electrochem. Soc,.* 143:2852–2862 (1996)), or mesoporous metals (prepared from liquid crystalline phases) (Attard et al., *Science,* 28:838–840 (1997)), on the smaller end (less than 10 nm), and metal foams on the larger end (greater than hundreds of $\mu$m). Whereas access to the high surface areas in Raney nickel is diffusion limited, the large surface area of the macroporous nickel presented herein is more easily accessible through the large void spaces. As a result, improved performance may be possible in applications such as porous electrodes, electrochemical capacitors, or supports for solid electrolytes.

Structural features of these materials are described herein, based on electron microscopy, electron diffraction (ED), powder X-ray diffraction (PXRD), adsorption methods, solid state MAS-NMR spectroscopy, and chemical analysis. Generally, the macroporous materials formed have an inorganic framework surrounding uniformly sized voids that, in three dimensions, form a colloidal crystal template and are interconnected through windows.

The voids (i.e., pores or void spaces) of the macroporous material are of a size that depends on the size of the particles of the template. Typically, some shrinkage occurs such that the voids of the macroporous inorganic material is often 20–40% smaller in size than the particle size of the original polymer particles of the template. Preferably, the voids are about 30 nm to several micrometers, and more preferably, about 100 nm to about 1000 nm in size.

The walls of the macroporous material can include amorphous phases, crystalline phases (in a variety of grain sizes), or combinations thereof. The walls can be in the form of sheets, rods, etc., depending on the processing parameters. The walls can be porous or nonporous.

Many interesting properties are foreseen for the macroporous solids studied here, including physical (optical) and chemical properties (reactivity, catalytic activity). Various applications could potentially profit from these materials. For example, catalysis and large-molecule separation processes could benefit from more uniform porous supports that provide optimal flow and improved efficiencies. The pores are in a size regime that permits immobilization and stabilization of large guest molecules, including biological molecules. As walls could be composed of semiconducting materials as well as insulating materials, applications as porous electrodes or electrolytes may be possible.

Synthesis of Bimodal Structures

The present invention provides a method of forming a bimodal material, i.e., a material having a bimodal pore structure containing both macropores (greater than about 50 nm) along with micropores (about 0.2 nm to about 2 nm) and/or mesopores (greater than about 2 nm up to about 50 nm) in the material that forms the framework. Preferably, the material having a bimodal structure is a zeolite analogue, and more preferably, a silicalite (preferably, with about 50% crystallinity). For example, a material having a bimodal pore structure of macropores that are surrounded by mesoporous silica, or preferably, microporous silicalite, walls can be prepared.

A dual templating method is used to control the hierarchichal pore system. The macropores are formed by using colloidal crystal templates and an inorganic precursor composition, as described above. The porosity of the walls is controlled with the use of a structure-directing agent in the inorganic precursor composition. As used herein, a structure-directing agent is one that is capable of causing the formation of microporous material in the framework of the macroporous material. Examples include tetrapropylammonium hydroxide (TPAOH), tetramethylammonium hydroxide (TMAOH), as well as others listed in Szostak, *Molecular Sieves: Principles of Synthesis and Identification,* Van Nostrand Rheinhold, New York, N.Y. (1989). The use of such structure-directing agents are common in the preparation of zeolites and zeolite analogues. The structure-directing agent can be added in the inorganic precursor composition or separately (e.g., in the vapor phase).

Also, a surfactant can be used in the inorganic precursor composition for certain advantage. A surfactant can be used to give a narrower pore size distribution in the framework as a result of the formation of micelles. Suitable surfactants include nonionic, anionic, or cationic surfactants. Examples of surfactants include cetyltrimethylammonium hydroxide, and others, including block copolymers, such as those listed in Huo et al., *Chem. Mater.*, 8, 1147–1160 (1996): and Zhao et al., *Science*, 279, 548–552 (1998). Mixtures of surfactants can be used if desired.

In a specific example in the formation of a zeolite analogue, the porous product is prepared by percolating a mixture of TPAOH and tetraethyl orthosilicate (TEOS) through a template of close-packed latex spheres. Heat treatment, preferably at a temperature of about 110° C. to about 130° C., followed by removal of the organic components, preferably by calcination, produces walls around void spaces.

Thus, the present invention provides a macroporous zeolite analogue having a bimodal pore structure that includes micropores and substantially uniform macropores, which are not necessarily ordered as defined herein. A preferred such zeolite analogue is a silicalite. In another embodiment, the present invention provides a macroporous material having a bimodal pore structure that includes mesopores and macropores, wherein the macropores are ordered as defined herein. A preferred such material includes silica.

These materials having bimodal pore systems may find use as chromatographic supports and size-selective solid catalysts that combine the advantages of size-selectivity in the smaller pores and easy access through the macropores. For example, micropores in zeolite analogues provide size- and shape-selectivity for guest molecules; channels in porous solids often impart the material with very high surface areas, which can increase host-guest interactions. The macropores provide easier access to the active sites. Relatively thin paths through the thin sample walls are expected to improve reaction efficiencies and minimize blocking of channels.

Further incorporation of heteroatoms in the silica framework is expected to lead to catalytic or chromatographic supports with improved efficiencies, due to easier transport of guest molecules through the macropores and shorter diffusion pathways in the walls.

EXAMPLES

Objects and advantages of this invention are further illustrated by the following examples, but the particular materials and amounts thereof recited in these examples, as well as other conditions and details, should not be construed to unduly limit this invention.

Example I

Synthesis of Macroporous Structures Using a Template

A. Experimental

1. Synthesis of Surfactant-free Polystyrene (latex) Spheres

Non-crosslinked, monodisperse polystyrene spheres were synthesized using an emulsifier-free emulsion polymerization technique according to literature. (L. Wang, *Ph.D. Thesis*, University of Minnesota, Minneapolis, Minn. (1993)). All water in the forthcoming synthetic steps was distilled and deionized to a resistivity of at least 17.6 M $\Omega$-cm. Two hundred ten (210) milliliters (mL) of styrene (Aldrich, Milwaukee, Wis.) was washed in a separatory funnel four times with 200 mL of 0.1 M NaOH (EM Science), then four times with 200 mL of water. A five-neck, 3000-mL round-bottom flask was filled with 1700 mL of water and heated to 70° C., before 200 mL of the washed styrene was added. Attached to the flask was an electric motor driving a glass stirring rod and Teflon wedge, a thermometer, a condenser, a pipette through which house nitrogen was bubbled to degas the mixture, and a stopper for the addition of reactants. In a separate 160-mL polyethylene bottle, 0.663 g potassium persulfate initiator (Fisher) was added to 100 mL of water and heated to 70° C. The water and styrene solution was reheated to 70° C. and the initiator was added.

To facilitate later removal of the latex spheres from the macroporous product, no cross-linking agent was added. The temperature was kept at 70±2° C. while the solution was stirred at about 245 or about 360 revolutions per minute (rpm) for 28 hours. The resulting latex spheres were filtered through glass wool to remove any large agglomerates. The latex spheres remained suspended in their mother liquor until needed. Before use, the spheres were centrifuged at about 900 rpm to about 1000 rpm (k-factor of about 3.1× $10^5$) for 12 hours to 24 hours, then allowed to air dry. In the present studies, spheres with diameters ranging from 421±40 nm to 697±64 nm were produced at stir rates between about 245 rpm and about 360 rpm, keeping all other experimental conditions the same. The diameters of the spheres were estimated using scanning electron microscopy (SEM).

2. Synthesis of Macroporous Solids

Macroporous Oxides

The alkoxide precursors employed for each macroporous solid were used as received without further purification. Tetraethoxysilane (TEOS, 98%), tetramethoxysilane (TMOS), aluminum tri-sec-butoxide (97%), zirconium n-propoxide (TPZ, 70%, in propanol), and vinyltriethoxysilane (VTES) were all obtained from Aldrich. Titanium(IV) ethoxide (TET, 95%), antimony(III) n-butoxide, iron(III) ethoxide, vanadium tri-n-propoxide, tungsten (V) ethoxide (95%), copper(II) ethoxide, cerium(IV) isopropoxide, yttrium isopropoxide (95%), and zirconium n-propoxide (70%) were purchased from Gelest and 2-cyanoethyltrimethoxysilane (CETMS) from United Chemicals.

The macroporous solids were prepared as follows: millimeter-sized chunks of dried latex spheres were added to a Büchner funnel attached to a vacuum of about 100 milliTorr (mTorr) and wetted with about 1 mL of absolute ethanol. The liquid alkoxides were then added by pipette until the spheres were completely wetted. Most liquid alkoxides could be used neat. By diluting the alkoxides in ethanol, it was found possible to adjust the viscosity and hydrolysis/condensation rates of the alkoxide. Especially in the case of titanium ethoxide and zirconium n-propoxide, dilution with ethanol suppressed premature metal oxide precipitation upon exposure to air. The relationships between the alkoxide concentration in alcohol and the structure of the macroporous solids was studied for a number of concentration series listed in Table 1.

TABLE 1

Weight Percent of Inorganic Solid Remaining After Template Calcination for Various Weight Ratios of Alkoxide, Alcohol, and Latex Spheres

| alkoxide, alcohol[a] | alkoxide/ alcohol (wt:wt) | alkoxide/ spheres (wt:wt) | remaining inorganic after calcination[b] (wt %) |
|---|---|---|---|
| TEOS, ethanol | 100:0 | 10.0 | 5.2 |
|  | 70:30 | 7.0 | 2.9 |
|  | 55:45 | 5.5 | 5.5 |
| TET, ethanol | 100:0 | 5.4 | 10.0 |
|  | 43:57 | 2.7 | 8.9 |
|  | 29:71 | 1.8 | 6.3 |
|  | 14:86 | 1.1 | 2.9 |
|  | 13:87 | 0.7 | 4.2 |
| TPZ, 1-propanol, ethanol | 70:30 | 3.0 | 12.7 |
|  | 40:60 | 1.8 | 13.5 |
|  | 21:79 | 1.0 | 5.9 |
|  | 18:82 | 0.9 | 6.7 |
|  | 15:85 | 0.7 | 5.0 |

[a]Macroporous aluminum oxide/hydroxide. In a typical sample preparation a 1.5:1 ratio of the aluminum tri-sec-butoxide/2-butanol/latex sphere composite was formed. Template removal was achieved by calcination at 575° C. in air for 7 hours, leaving 10.5 wt % of the inorganic product.
[b]Determined by TGA for silica samples, by weighing before and after calcination for titania and zirconia samples.

In the synthesis of macroporous alumina, the high viscosity and reactivity of aluminum tri-sec-butoxide made it necessary to dilute it to 50 weight percent (wt %) with 2-butanol. Solid iron(III) ethoxide was prepared as a 25 wt % solution in ethanol. About 6 mL of solution was used per 0.25 grams (g) of dried spheres. Copper(II) ethoxide, cerium (IV) isopropoxide, and yttrium tri-isopropoxide by themselves were too insoluble in their corresponding alcohols to allow an ordered macroporous structure to form. Solid yttrium isopropoxide could be dissolved in 70 wt % zirconium n-propoxide in propanol to give a zirconium/yttrium (Zr/Y) mole ratio of 22:1.

The coated latex spheres were dried in air or a vacuum desiccator for about 3 hours to about 24 hours. Polystyrene was removed from the inorganic framework by calcination in air at about 450° C. to about 575° C. for about 6 hours to about 8 hours (about 575° C. for titanium, aluminum, silicon, zirconium; about 450° C. for antimony, tungsten, iron, germanium, vanadium, zirconium/yttrium) or at about 1000° C. for 2 hours to study phase changes in titania samples. Alternately, to attain milder conditions, polystyrene was extracted by Soxhlet extraction for 1–6 days in a 1:1 volume/volume (v/v) mixture of tetrahydrofuran (THF) and acetone.

Aluminophosphates

First, 2.04 g aluminum isopropoxide (Eastman), 1.15 g 85% $H_3PO_4$ (Aldrich), 3.64 g 25% tetramethylammonium hydroxide (TMAOH (Aldrich)) and 2.94 g of water were mixed in a polyethylene bottle. The resultant white solution was rapidly stirred for at least 17 hours before use, at which time it was added to the latex spheres. The latex spheres coated with aluminophosphate were dried overnight in air and then calcined at about 850° C. in air for 7 hours.

Silicates with Mesoporous Walls

An aqueous mixture containing 20 mL of 8 wt % cetyltrimethylammonium hydroxide (CTAOH), 2.1 g TEOS, and 1.0 g of 1 molar (M) tetrapropylammonium hydroxide (TPAOH) (Aldrich) was stirred at 70° C. for 1 hour, filtered and allowed to permeate through the packed polystyrene spheres. The product was dried and calcined at 575° C. in air for 6 hours.

Silicates with Organic Functional Groups

Hybrid organic/inorganic sieve structures were synthesized using mixtures containing 1.8–9.1 TEOS:1.0 VTES:8.3–41 ethanol, or 5.8–17 TMOS:1.0 CETMS:27–82 methanol (mole ratios) as precursors. In a Büchner funnel, a 2–4 millimeter (mm) layer of dried latex spheres was placed on filter paper. Approximately 2–4 mL of the mixed precursor solution was added to the spheres. The organosilicate/latex sphere composites were dried overnight in a vacuum desiccator. The latex spheres were removed from the inorganic/organic composites by extracting for 1–6 days with a 1:1 (v/v) mixture of THF and acetone in a Soxhlet extractor.

3. Product Analysis

Powder XRD studies were performed on a Siemens D5005 wide angle XRD spectrometer with Cu—Kα radiation, operating at 40 kilovolts (kV) and 45 milliamps (mA). In a typical sample preparation, the template-free macroporous materials were gently crushed with a mortar and pestle and placed in low-background, off-axis quartz cells with cavities 1 mm deep and 12 or 20 mm in diameter. For particle-size determinations based on the Scherrer equation, the macroporous materials were ground together with a potassium halide (KCl, KBr or KI) as a linewidth standard.

Scanning electron micrographs (SEM) were recorded digitally using a Gatan Digiscan and Digital Micrograph on a JEOL 840 SEM operating at 7 kV. Samples for SEM were dusted on an adhesive conductive carbon disc attached to an aluminum mount. The samples were then coated with 5 nanometers (mn) platinum or gold/palladium. Transmission electron micrographs (TEM) were recorded on film with a Philips CM30 TEM operating at 300 kV with a $LaB_6$ or W filament. Samples for TEM were prepared by sonicating about 20 mg of the powder in 2 mL absolute ethanol for 30 minutes, then depositing five drops of the suspension on a holey carbon grid.

Micrographs were scanned on a Microtek ScanMaker III scanner for further analysis. A fast Fourier transform (FFT) was used to analyze the spatial periodicity of the structure. The structure was indexed by correlating the FFT pattern and TEM goniometer tilt to theoretical diffraction patterns. Energy dispersive spectra (EDS) were acquired using an EDAX PV9900 equipped with an ultrathin window silicon (lithium) detector.

Spectra were acquired with the sample tilted 30° toward the detector for 200 seconds live time. Chemical analyses for carbon, hydrogen, and sulfur were carried out at Atlantic Microlabs Inc., Norcross, Ga., and analyses for silicon, titanium, zirconium, aluminum and phosphorous at the Geochemical Lab, University of Minnesota, Minneapolis, Minn. Nitrogen adsorption measurements were performed on a RXM-100 sorption system (Advanced Scientific Designs Inc.) or a Micromeritics ASAP 2000 V3.00 sorption analyzer utilizing BET calculations of surface area and BJH calculations of pore volume and pore size distributions for the adsorption portion of the isotherm. Mercury porosimetry measurements were carried out on a Micromeritics Poresizer 9320.

Thermogravimetric analysis (TGA) was performed on a Perkin-Elmer TGA-7 thermal analyzer attached to a personal computer (PC) via a TAC7/DX thermal controller. The samples were heated under flowing air from 30° C. to 800° C. at 10° C./minute. Solid-state $^{29}Si$ (79.4 MHz, pulse width 4 microsecond ($\mu s$), pulse delay 300 second (s), 254 transients, 3 kHz spin rate), $^{27}Al$ (104.3 MHz, pulse width 30 $\mu s$, pulse delay 1.5 s, 16384 transients, 3 kHz spin rate) and $^{31}P$ (162.0 MHz, pulse width 4 $\mu s$, pulse delay 10 s, 512 transients, 3 kHz spin rate) MAS-NMR measurements were performed on a Chemagnetics CMX Infinity spectrometer. TMS, 1 M $Al(H_2O)_6^{3+}$ and 85% $H_3PO_4$ were used as external chemical shift standards. FT-IR spectra were collected on a Nicolet Magna FT-IR 760 spectrometer from samples prepared as KBr pellets.

B. Results and Discussion

1. Ordering the Latex Spheres

Centrifuging the latex spheres resulted in the formation of an iridescent sediment on the bottom of the centrifuge tube with a clear solution above. The clear solution was decanted, and the latex spheres were air died before treatment with the network-forming solutions. In order to obtain periodic void structures, it was important to employ uniformly sized templates. Scanning electron micrographs show the monodispersity of the latex spheres, FIG. 1. It should be noted that the centrifuged spheres were already ordered into close-packed domains at this stage before any alkoxide had been added. Although the latex sphere templates contained stacking faults, point defects, line defects and larger disordered regions, FIG. 1 shows facets corresponding to the (100), (011), and (111) sets of planes that typify an fcc structure. These observations are similar to reported findings for silica nanospheres (Miguez et al., *Langmuir*, 13:6009–6011 (1997)). It was difficult to determine the phase purity of the close-packed spheres by SEM, since the amount of spheres in a typical centrifuged sample was quite large. Phases other than fcc or disordered phases may be present. However, the fcc structure was observed in templated macroporous silica, titania, zirconia and yttria/zirconia particles (see below).

Some disorder observed by SEM was likely created during the preparation of these brittle colloidal crystals for electron microscopy. Although large defects were templated into the inorganic product, healing of smaller defects by capillary effects was conceivable during wetting of the colloidal latex crystal. Nonetheless, it appeared that close-packing of the spheres was important before alkoxide addition to result in the highest amount of ordered product after addition of the inorganic components and subsequent template removal. In experiments when TEOS/ethanol solutions were added to completely disordered latex spheres, ordering did not occur upon evaporation of ethanol and condensation of the silicate.

2. Addition of Inorganic Precursors

Percolation of alkoxides through the latex spheres produced highly ordered composite structures (i.e., impregnated colloidal crystal templates). In fcc or hcp structures approximately 74% of the volume is occupied by the monodisperse spheres; in bcc lattices the value is about 68%. The remaining 26% or 32% of volume can, in principle, be filled by the inorganic precursors.

Figure 2:
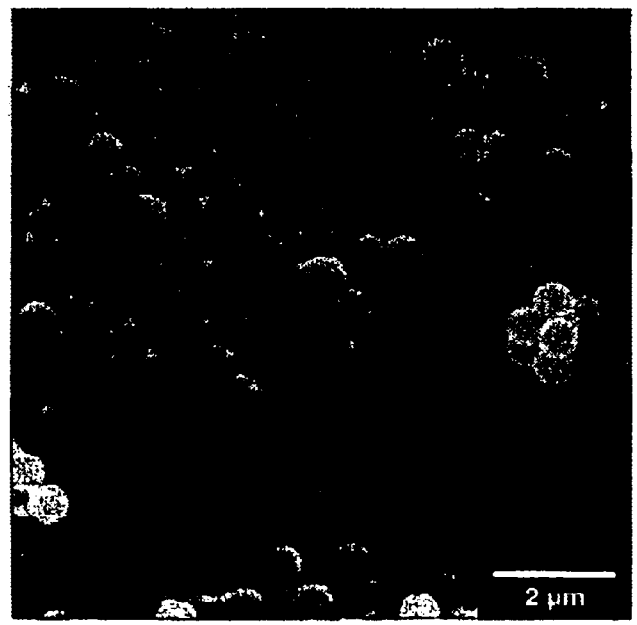
FIG. 2. SEM of a latex sphere template that had been infiltrated with TEOS and dried at room temperature.

The SEM image in FIG. 2 depicts the composite structure obtained after TEOS was added to a template of polystyrene spheres to coat the spheres. The spaces between spheres were filled by layers of partially condensed silica, indicating that the inorganic precursor was able to diffuse through the interstitial voids between the close-packed spheres during the vacuum-assisted percolation process. In addition, individual spheres were visible, as well as hollow silica replicas of spheres that were probably dislodged during sample preparation (fracturing) for SEM. From the SEM images it could not be determined whether individual spheres were coated with silica; however, in some calcined samples isolated hollow spheres of the inorganic oxide were observed, which must have formed around polystyrene spheres that had become dislodged from the colloidal crystal.

It is interesting that condensation of the metal alkoxides, including TEOS, occurred upon drying of the latex/alkoxide composites in air, without the addition of an external acid or base catalyst. Initially the composite materials were soft and pliable, but they hardened over a period of minutes (titania, zirconia) to hours (silica), depending on the reactivity of the alkoxide in air, the temperature, and the humidity. It is possible that protonated carboxyl groups present on the surface of the latex spheres (Goodwin et al., *Br. Polym. J.*, 10:173–180 (1978), Goodwin et al., *Br. Polym. J.*, 5:347–362 (1973)), catalyzed the hydrolysis and condensation reactions. Further condensation occurred during template removal by thermal methods.

3. Removal of Latex Spheres

Removal of the latex spheres was typically accomplished by calcination in air at temperatures ranging from 450° C. to 1000° C. As the organic template escaped, it created windows between adjacent voids. Based on the carbon content of the products (0.4 wt % to 1.0 wt %), the organic components were nearly completely removed. The amount of inorganic solid remaining after latex sphere removal was about 3 wt % to about 14 wt % of the composite material, based on TGA measurements. The maximum theoretical values, assuming complete filling of the interstitial spaces in a close-packed structure with alkoxide, were 8.0 wt % for $SiO_2$ from TEOS, 9.9 wt % $TiO_2$ from titanium ethoxide and 8.2 wt % $ZrO_2$ from 70% zirconium n-propoxide. These theoretical yields are based on the combined mass of polystyrene spheres and alkoxide. Lower yields can be attributed to incomplete filling of interstitial space; higher yields imply expansion of colloidal crystal or formation of a dense phase with low porosity (see below).

In an alternative procedure, the polystyrene could be extracted with a THF/acetone solution. An ordered macroporous structure was maintained after extraction. However, the windows connecting the spheroidal voids were often smaller or absent after the extraction process. Nonetheless, based on IR spectroscopy, most polystyrene was removed after extraction. The conditions of template removal affected the phase of the walls in the macroporous product. Low temperature calcination or extraction could produce macroporous structures with amorphous walls, which, in turn, exhibited micro- or mesoporosity and high surface areas. Higher temperature calcination permitted the formation of crystalline walls. Extraction was also useful to avoid high temperatures in order to preserve organic moieties.

4. Description of the Inorganic Replica Structure

A structural description for these solids has to cover multiple hierarchies, including the macroporous structure, and the structure within the wall at the atomic level or sometimes the mesoscopic level. These hierarchies will be discussed in more detail in this section.

Macroporous Level

The macroscopic structure of the inorganic solids was predetermined by the arrangement of the latex sphere templates. The void diameters depended on the size of the latex spheres. It should be noted that, typically, 26%–34% shrinkage of the structure occurred during calcination, similar to observations by other groups for macroporous (Velev et al., *Nature*, 389:447–448 (1997)), and mesoporous silica samples (Raman et al., *Chem. Mater.*, 8:1682–1701 (1996)). These shrinkage data were average values measured by comparing a large number of pore center-to-center distances in the template-free samples with center-to-center distances in the templating latex sphere templates. Based on the relatively narrow pore size distributions observed by SEM and TEM, contraction appeared to occur uniformly throughout the samples. Extraction diminished the amount of shrinkage only slightly. For example, for a sample of macroporous titania, 34% shrinkage was observed upon calcination and 24% upon extraction.

Figure 3:
FIG. 3. SEM of a macroporous $TiO_2$ crystal (anatase) with voids ordered over tens of $\mu$m (110 $\mu$m×60 $\mu$m×50 $\mu$m).

Although monodispersity of the spheres was important to obtain periodic void structures, the overall frameworks exhibited similar structures for samples prepared from spheres of different diameters between about 420 nm and about 700 nm. Areas exhibiting close-packing of pores were seen over tens (FIG. 3) and sometimes hundreds of micrometers. Most particles observed in the SEM showed steps, facets and edges (e.g., FIGS. 4a and 4d). Although many of these regions were defect-free, some areas showed point defects and, especially in large crystals, stacking faults, analogous to our observations for the latex sphere templates. In addition, large ordered domains were sometimes separated by cracks running through the pseudocrystal. Channels may have been created when the alkoxide was drawn through the bed of templating spheres under vacuum or during the subsequent template removal process.

Figure 5:
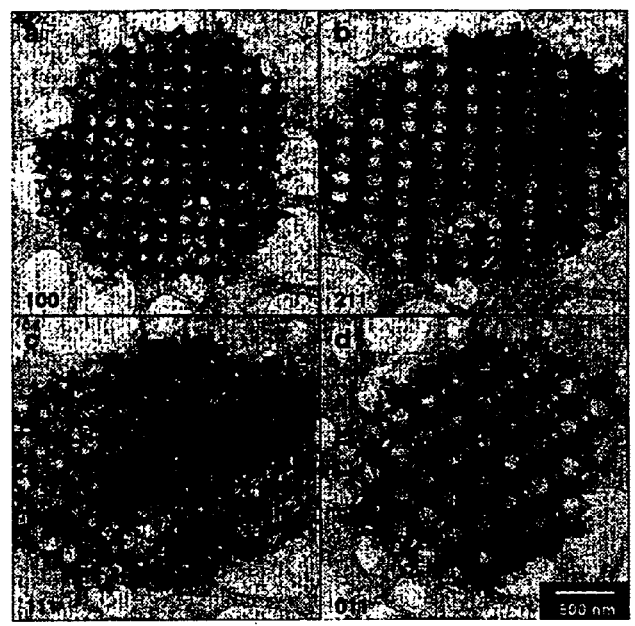
FIG. 5. A series of four TEMs of an yttrium-zirconium oxide sample tilted through 90° showing four different orientations. The directions were indexed to an fcc lattice by taking the Fourier transform of each image and comparing its spatial periodicity and tilt angle to a theoretical fcc lattice. (a) 0°, [100] direction, plane group p4mm; (b) 35.3°, [211] direction, plane group p2mm; (c) 54.7°, [111] direction, plane group p6mm; (d) 90°, [110] direction, plane group c2mm.

The structure of the pseudocrystals was indexed by a series of tilting experiments carried out in the TEM. Several ordered macroporous particles of silica, titania, zirconia, and zirconia/yttria were tilted through a 90° tilt along one axis. When the pores were in alignment with the beam direction, the angle was noted and a picture was recorded. These images were analyzed by Fourier analysis to determine their spatial periodicity. FIG. 5 shows an example. In each image, the dark areas correspond to the ceramic framework and the light areas to the void space. Background structure in the image is a result of the holey carbon support upon which the samples were loaded. The direct images and Fourier transforms (not shown) are consistent with views along directions (100) of FIG. 5a, (211) of FIG. 5b, (111) of FIG. 5c, and (011) of FIG. 5d, for a lattice formed by filling the interstitial spaces of an fcc template of spheres (space group Fm3m, no. 225).

The wall thicknesses and sizes of window openings between walls depended on the alkoxide precursors, in particular the viscosity and hydrolysis or condensation rates of the precursors. Average wall thicknesses are listed in Table 2.

TABLE 2

Wall Compositions, Dimensions, Surface Areas, and Porosity Data for the Macroporous Solids

| sample composition (preparation)[a] | phase (PDF file no.)[b] | surface area[c] (m$^2$/g) | pore volume[d] (mL/g) | median pore diameter[e] (nm) | wall thickness (nm) | wall particle size[f] (nm) |
|---|---|---|---|---|---|---|
| SiO$_2$ | | | | | | |
| (100:0) | amorphous | 173 [0.11] | 0.38 [0.91] | 8.9 [180] | 58–132 | N/A |
| (70:30) | amorphous | 220 [0.55] | 0.39 [1.39] | 6.9 [190] | 39–94 | N/A |
| (55:45) | amorphous | 231 [2.95] | 0.44 [1.75] | 7.3 [460] | 33–74 | N/A |
| (100:0, surfactant) | mesoporous walls | 1337 | 0.80 | 2.3 | 29–37 | N/A |
| TiO$_2$ (extraction) | amorphous | 157 | 0.36 | 21.1 | 37–58 | N/A |
| (575° C.) | anatase (21-1272) | 50 (22) | 0.26 | N/A | 24–36 | 20–35 |
| (1000° C.) | anatase/rutile | 18 | 0.07 | N/A | 19–67 | 18–99 |
| ZrO$_2$ | baddeleyite (37-1484) | 9 (38) | 0.06 | N/A | 9–13 | 8–13 |
| Al$_x$O$_3$·xH$_2$O | amorphous | 195 | 0.63 | 10.5 | 4–6 | N/A |
| Fe$_2$O$_3$ | hematite (33-0664) | | | | 22–52 | 22–120 |
| Sb$_4$O$_6$ | senarmontite (43-1071) | | | | 12–66 | 12–156 |
| WO$_3$ | tungsten trioxide (43-1035) | | | | 14–32 | 8–68 |
| Y$_{0.043}$Zr$_{0.957}$O$_2$ | yttria-stabilized zirconia (30-1468) | | | | 8–41 | 6–29 |

[a]For silica, the ratios in parentheses refer to dilution values (TEOS/ethanol). For titania, the sphere removal method is listed.
[b]Phases were identified by selected area ED and PXRD.
[c]BET surface areas obtained with a Micromeritics ASAP 2000 V3.00 sorption analyzer, except for values in parentheses, which were obtained with an RXM-100 sorption analyzer. Values in square brackets are total pore areas obtained from mercury porosimetry at pressures between 0 and 2500 psia.
[d]Average BJH pore volumes from the adsorption pore volume plots. Values in square brackets are intrusion volumes obtained from mercury pososimetry.
[e]Average BJH pore diameters from the adsorption pore volume plots. Values in square brackets are median pore diameters obtained from mercury porosimetry.
[f]Wall thicknesses and particle sizes were estimated from TEM images
(N/A = not applicable).

These parameters could be controlled to some extent by diluting the precursors with alcohols and by adjusting the humidity of the environment Addition of alcohols could modify the hydrolysis and gelation rates of the alkoxides. The order of void spaces was also affected by viscosity and dilution. Ordered structures were obtained only in a limited dilution range.

Figure 4:
FIG. 4. SEM images of macroporous titania, zirconia, and silica samples synthesized from alkoxides at various dilution levels. The fractions of alkoxide in solvent are (a) 100% TET, (b) 43% TET, (c) 14% TET, (d) 70% TPZ (30% n-PrOH, 0% EtOH), (e) 21% TPZ (9% n-PrOH, 70% EtOH), (f) 15% TPZ (6% n-PrOH, 79% EtOH), (g) 100% TEOS, (h) 70% TEOS, (i) 55% TEOS.

The effects of alkoxide dilution with alcohol were studied for macroporous silica, titania, and zirconia samples. The SEM images shown in FIG. 4 depict the changes in wall thickness and ordering of the mesopores for products obtained at various dilution ratios. FIGS. 4a–c show examples for macroporous titania samples, obtained from titanium TET with ethanol as diluent. The number of structural defects increased with increasing amounts of ethanol, and disordered macroporous structures were formed at titanium TET/ethanol ratios below about 21:79. At the same time the fraction of inorganic material in the composite product decreased, as shown in Table 1. The effects of diluting the zirconium alkoxide precursor with alcohol were similar to those observed for titania. Dilution in ethanol resulted in the formation of less ordered structures, as shown in the SEM images of FIGS. 4d–f. At higher dilution, the alcohol may have partially dispersed the colloidal latex crystal, causing the decrease in order observed for the templated oxides.

Figure 6:
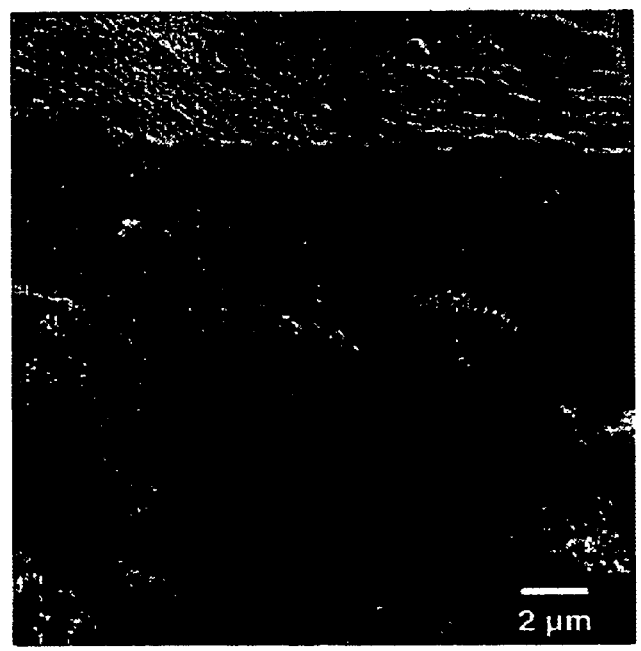
FIG. 6. SEM of a macroporous anatase particle showing gradients in the density of the inorganic component and gradients in the order of voids.

FIGS. 4g–i show that by adjusting the concentration of TEOS added to the latex spheres with ethanol, it was possible to control the wall thicknesses and window sizes between voids. The ability to vary the dimensions of the walls, as well as those of the pores in a controlled fashion is important in certain applications, such as photonic crystals, so that the periodicity in the dielectric constant can be adjusted. The average wall thickness of the pure TEOS sample in FIG. 4g was about 90 nm. As ethanol was added to the TEOS synthesis mixture (TEOS/ethanol=70:30 wt/wt) the openings between pores increased considerably, and the average wall thickness decreased to about 67.5 mn (FIG. 4h). In this figure, it was possible to observe the macropore openings (darker holes) in the layer underneath the first layer. For a TEOS/ethanol weight ratio of 55:45, the SEM micrograph (FIG. 4i) depicts a highly ordered macroporous structure with even larger windows and an average wall thickness of about 54 nm. This micrograph shows a high degree of interconnectivity between voids and 3D periodicity in multiple layers. Mercury porosimetry (limited to 2500 psia) revealed a small increase in intrusion volume, total pore area, and median pore diameter, as TEOS was diluted (Table 2). An SEM of the sample obtained from a 55:45 TEOS/ethanol solution confirmed that the framework remained intact at this pressure, which falls within the pressure ranges utilized in high pressure liquid chromatography. The framework fractured after a porosimetry measurement carried out at pressures up to 31,000 psia Some of the possible effects of sample preparation technique were evident from FIG. 6, which shows the SEM of a calcined titania sample exhibiting three different regions: a dense phase, monodisperse disordered macropores, and ordered macropores from top to bottom. The dense phase arose from the use of excess alkoxide in the synthesis. The extra reagent did not percolate through the spheres and formed a thick crust on the top. Only a few pores were present in the solid phase as a consequence of some latex spheres escaping. Other spheres could not escape, resulting in small amounts of residual carbon in the bulk analysis of such samples. The disordered, intermediate phase was probably the result of surface agitation and the inability of the spheres to coalesce again upon drying. Similar disorder was observed in samples prepared from highly diluted titanium or zirconium alkoxides. The bottom of the SEM micrograph, FIG. 6, displays order over a length of about 15 $\mu$m and illustrates the penetration depth of the inorganic precursor through multiple layers of spheres.

Wall Structure

Figure 7:
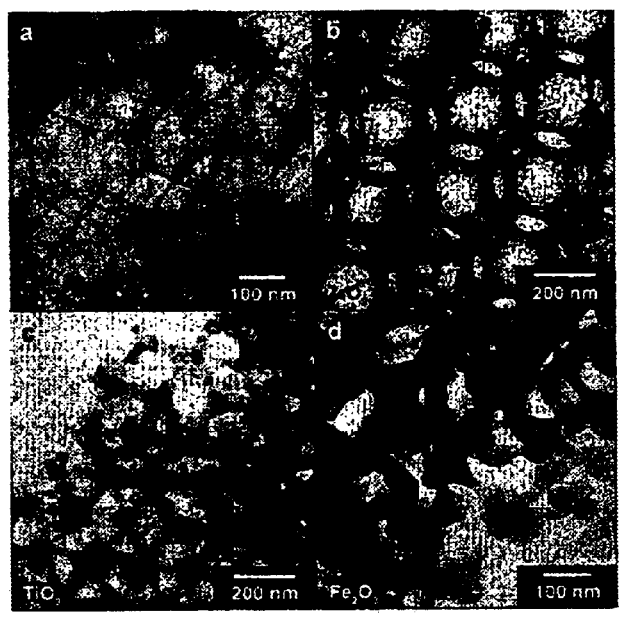
FIG. 7. (a) TEM showing the gossamer "sheet" structure of the walls of a macroporous alumina particle a few degrees from its [100] orientation. (b) Bright field TEM image of macroporous zirconia in the [011] orientation. Small crystalline appendages are visible along the edges of the dark "rods." (c) TEM of macroporous titania prepared by calcination at 1000° C. for 2 hours, showing crystals that are considerably larger than in a sample calcined at 575° C. for 8 hours. (d) TEM of the wall structure of macroporous iron oxide oriented along [100].

The wall structure of the macroporous solids can be classified into three categories: "sheets," "rods," and "large crystals." FIG. 7 shows TEM images of each category. FIG. 7a provides a good example of a "sheet" wall structure. The walls of this macroporous alumina sample were extremely thin (about 4 m to about 6 nm) and amorphous. Nodes in the skeleton were occupied by a filled diamond (sometimes nearly square) when viewed along the (100) orientation. In many other samples the diamond was not filled, resulting in a lower surface energy (see, for example, FIG. 5a). A "rod" structure was exhibited by macroporous zirconia, where rods converged in nodal points (FIG. 7b). The walls were in fact polycrystalline, but the crystals were smaller than the average wall thickness. Walls consisting of larger crystallites, an "anatase," were formed, for example, in macroporous titania prepared by calcination at 1000° C. for 2 hours (FIG. 7c). Similar large crystallites of hematite were visible in the sample of macroporous iron oxide (FIG. 7d). For the samples investigated thus far, an increase in wall particle size led to a reduction in periodicity of the macropores.

The walls of the macroporous sieves were identified as amorphous or crystalline phases based on powder X-ray diffraction measurements of the bulk materials and on selected area electron diffraction patterns obtained by TEM. Amorphous walls exhibited additional mesoporosity leading to higher surface areas. The observed phases and dimensions of the walls are listed in Table 2 and are discussed below in more detail for each composition. As expected, the oxides formed walls composed of the thermodynamically most stable phase at a given processing temperature.

Macroporous Silica

Figure 8:
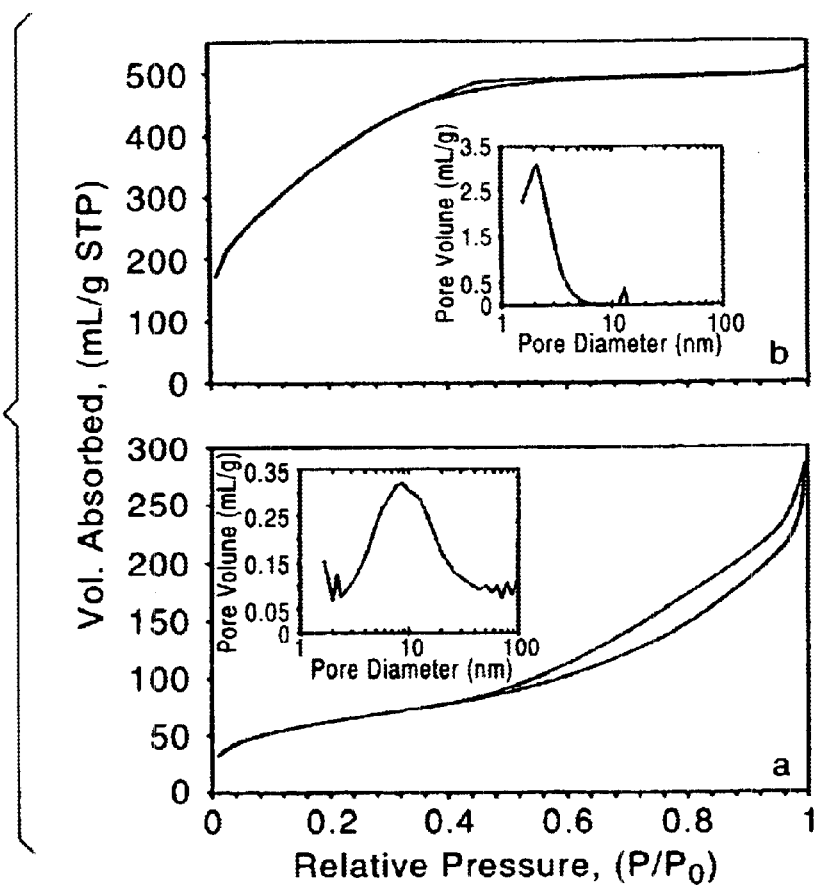
FIG. 8. Nitrogen adsorption isotherms and pore size distribution plots for macroporous silica. (a) Undiluted TEOS was used as precursor. No surfactant was added during the synthesis. (b) Surfactant added.

The walls in macroporous silica samples were X-ray amorphous. They were further characterized by nitrogen adsorption measurements and solid-state $^{29}$Si MAS-NMR spectroscopy. Table 2 lists the nitrogen adsorption results obtained for materials prepared from pure TEOS and from the TEOS/ethanol systems mentioned above. A Type II nitrogen adsorption isotherm with some adsorption hysteresis was observed for all three silica materials (FIG. 8a). The shape of the isotherm, in particular the large rise in adsorption at increased relative pressures, was characteristic for walls composed of tenuously assembled silica clusters. Both BET surface areas and BJH pore volumes increased upon dilution of TEOS with ethanol. The adsorption pore volume plots for the three silica materials showed a broad distribution of mesopores with diameters from about 2 nm to about 40 nm, indicative of the glassy nature of the framework. These mesopores gave rise to surface areas between 173 square meters/gram ($m^2$/g) and 231 $m^2$/g. $^{29}$Si MAS-NMR spectra exhibited one broad resonance centered around 110 parts per million (ppm), a value typical of $Q^4$ silicon atoms in silica glass. The broad peak arises from a distribution of bond angles in the $Q^4$ tetrahedral units.

It was possible to create narrower mesopore distributions by combining a modified MCM-41 synthesis with the latex sphere templating process. A TEOS/surfactant mixture was percolated through a latex sphere template, followed by hydrolysis and condensation of the silicate precursor. After removal of both surfactant and polystyrene by calcination, the macroporous product closely resembled that shown in FIG. 4g. The PXRD pattern showed a single, broad diffraction line at d=2.8 nm, typical for mesoporous silicates with a weak degree of order. The Type I nitrogen adsorption/desorption isotherm (FIG. 8b) showed a slow rise in the amount of nitrogen adsorption with increasing relative pressure and then approached a limiting value. It exhibited less hysteresis than the isotherms for the products of the surfactant-free syntheses, which has been interpreted to mean that the pores are smooth and cylindrical (Raman et al., Chem. Mater, 8:1682–1701 (1996)). The surface area and pore volume of this sample were greatly increased (1337 $m^2$/g, 0.80 $cm^3$/g, respectively). The mesopore size distribution tightened significantly, most mesopores being smaller than 4 nm with a peak at about 2.3 nm. Thus, a combined meso-/macroporous structure was created by the dual-templating process.

Macroporous Titania

The phase of the titania walls could be controlled by the conditions of template removal (Table 2). An amorphous titania phase was obtained when the sample had undergone relatively mild heat treatments during Soxhlet extraction of polystyrene by a THF/acetone solution at temperatures below 56° C. Template removal by calcination at about 450° C. to about 575° C. resulted in the formation of anatase walls, and higher heat treatment (at 1000° C.) produced a macroporous sample containing mostly anatase and some bulk rutile. When a macroporous anatase sample was cooled and reheated to 1000° C., rutile was formed, but the periodic void structure was lost by sintering.

In related studies, rutile walls were created at 1000° C. in a synthesis of macroporous titania based on oil/formamide emulsions (Imhof et al., *Nature*, 389:948–951 (1997)). The nitrogen adsorption measurements for the titania phases are listed in Table 2. All three phases exhibited similar Type II isotherms with a small amount of high pressure hysteresis. The isotherms are typical for unrestricted monolayer-multilayer adsorption on nonporous or macroporous adsorbents. The surface areas and pore volumes decreased from amorphous titania to anatase prepared at progressively higher calcination temperatures, as small crystallites composing the walls continued to sinter and grow.

Macroporous Zirconia

The walls of macroporous zirconia after template removal by calcination at 575° C. for 7 hours in air consisted of the crystalline baddeleyite phase. FIG. 7b shows a TEM image of the baddeleyite microcrystals that were fused together to create a network. Type II nitrogen adsorption isotherms were obtained, similar to those observed for the titania samples. The measured BET surface areas of these materials were mostly due to the small particle size of the crystallites.

Macroporous Yttria-stabilized Zirconia

The yttrium precursor for these samples, yttrium isopropoxide, was a solid and exhibited only limited solubility in zirconium n-propoxide. Nonetheless, with a ytterbium/zirconium ratio of 1/22 in the starting material, a remarkably ordered macroporous product was obtained. TEM combined with EDS showed that the yttrium was distributed evenly throughout the sample with a ytterbium/zirconium mole ratio of 1/32. The selected area electron diffraction pattern of the sample walls matched exactly with the powder diffraction file (PDF) pattern of cubic yttria-stabilized zirconia (PDF 30-1468). TEM images of the macroporous product viewed from different tilting angles were discussed above (FIG. 5). These images showed that the walls had a thickness and grain size comparable to the walls of pure macroporous zirconia. The grain sizes in the yttria/zirconia system ranged from about 6 nm to about 29 nm with wall thicknesses between about 8 nm and about 41 nm. The high chemical resistance and low thermal expansion coefficient of yttria-stabilized zirconia make this material an attractive ceramic support.

Macroporous Alumina

During the synthesis of macroporous alumina in air, hydrolysis and condensation of aluminum tri-sec-butoxide occurred so quickly that dilution with 2-butanol was necessary. Even with 50 wt % dilution, small particulates formed almost immediately. Nonetheless, an ordered macroporous product was obtained upon removal of the latex spheres by calcination at 575° C. in air for 7 hours. The walls of this material were thin amorphous sheets, exhibiting a high surface area (317 m$^2$/g). Nitrogen adsorption measurements of the calcined alumina sample gave a Type II isotherm with some hysteresis similar to that observed for the silica samples. The adsorption pore volume plot showed a very broad distribution in pore diameters from about 2 nm to about 100 nm. The majority of pores in the alumina sample arose from smaller mesopores with an average diameter of about 10.5 nm. $^{27}$Al MAS-NMR spectra revealed both octahedrally and tetrahedrally coordinated aluminum resonances at 12.0 ppm and 41.9 ppm, respectively, with an intensity ratio of about 4:1 for AlOh:AlTd.

Macroporous Antimony Oxide

Antimony(III) n-butoxide behaved in a similar fashion to zirconium n-propoxide and titanium ethoxide, except that upon calcination of the composite with latex spheres at about 450° C. the off-white macroporous product was less ordered than the samples discussed above. The walls were composed of senarmontite microcrystals (Sb$_4$O$_6$, PDF 43-1071). Cubic senarmontite is the thermodynamically stable form of antimony oxide below 570° C. and contains discrete Sb$_4$O$_6$ molecules (J. D. Smith, *Comprehensive Inorganic Chemistry*, Bailar et al., Eds. (Pergamon Press: Oxford, 2:547–683 (1973))). At 570° C., antimony oxide undergoes a phase transition to orthorhombic valentinite, in which alternate antimony and oxygen atoms are linked into bands, creating a macromolecular structure (Roberts et al., *J. Am. Chem. Soc.* 50:2125–2147 (1928)). When an antimony oxide/latex sphere composite was calcined at 575° C., nonporous, needlelike crystals were formed. As in the case of the anatase-to-rutile phase transition for macroporous titania, the latex-free macropore structure could not withstand the internal stresses during the cubic-to-orthorhombic phase transition of antimony oxide, which resulted in the loss of the macropore structure.

Oxides of Iron, Tungsten, and Vanadium

These transition metals can exhibit multiple oxidations states. The synthesis of macroporous iron oxide was different from the preparation of most other samples because the starting material, iron(III) ethoxide was a brown-black solid rather than a liquid. A 25 wt % solution in ethanol was able to penetrate the latex spheres. After calcination for 6 hours in air at 450° C. it produced many areas of rust-colored, ordered macroporous Fe$_2$O$_3$, although some nonporous bulk material existed in the sample. The walls in the macroporous sample were composed of about 22 nm to about 120 nm sized hematite microcrystals (FIG. 7d). The dimensions of individual particles were sometimes larger than the average wall thicknesses listed in Table 2, because some particles were elongated and orientated with the largest dimension along the wall direction. Longer heating times and higher temperatures created a porous, disordered material. Tungsten(V) ethoxide was less viscous and less reactive than either titanium ethoxide or zirconium n-propoxide.

After calcination of the latex sphere composite at 450° C., the product was a bright yellow-green macroporous tungsten (VI) oxide (WO$_3$, PDF 43-1035). Like the macroporous iron oxide, the structure was partially ordered but less periodic than the samples discussed above. Calcination at 575° C. created a porous, disordered material. Upon reduction under flowing hydrogen at 400° C. for 8 hours, the powder became blue, indicative of the formation of a nonstoichiometric oxide, WO$_x$ (2<x<3). Vanadium oxide did not form the "honeycomb" structure under the conditions listed above. Instead, latex-templated vanadium oxide, heated to 450° C., produced nonporous red-orange elongated crystals, a few micrometers in length. Macroporous vanadium oxide could be obtained when the polystyrene templates were removed at lower temperatures (between about 250° C. to about 300° C. for 12 hours); however, these products were not highly ordered and dense bulk vanadium oxide was present as a side product.

Macroporous Aluminophosphates

The walls in the ordered macroporous aluminophosphate obtained after calcination were X-ray amorphous and had an aluminum/phosphorous ratio of 1.7. The $^{27}$Al MAS-NMR spectrum of this sample showed resonances for tetrahedral aluminum at 41.0 ppm and for octahedral aluminum at about 14.5 ppm with an intensity ratio of about 6:1. The $^{31}$P MAS-NMR spectrum exhibited a single sharp resonance at about 26.1 ppm, which is typical for P(OAl)$_4$ environments in AlPO$_4$ materials. Both the $^{27}$Al and the $^{31}$P NMR shifts data indicated that the tetrahedral aluminum was surrounded by four tetrahedral phosphate groups, forming the aluminophosphate framework. The absence of a $^{31}P$ resonance at higher frequency (e.g., about 14 ppm) suggested that phosphorus was not bonded to octahedral aluminum and that the octahedral aluminum was present as extraframework aluminum. A BET surface area of 17 m$^2$/g and a relatively low pore volume of 0.04 milliliters/gram (mL/g) indicated that the aluminophosphate walls did not exhibit any micro- or mesoporosity.

Hybrid Organic/inorganic Macroporous Solids

Mesoporous silicates, related to MCM-41, with organic surface functional groups have recently been synthesized in a direct "one pot" synthesis (Huo et al., *Chem. Mater.*, 8:1147–1160 (1996); Burkett et al., *Chem. Commun.*, 11 1367–1368 (1996)). They were formed using organotrialkoxysilane precursors diluted with tetraalkoxysilanes. In the case of studies involving vinyl, thiol, and sulfonic acid groups, it was shown that the organic groups were incorporated in the condensed framework, most of them were present in the mesopore channels, and that they were accessible for further functionalization. Similar mixtures incorporating silicon-carbon (Si—C) bonds in a silicate network could be formed using the latex sphere templating technique.

Figure 9:
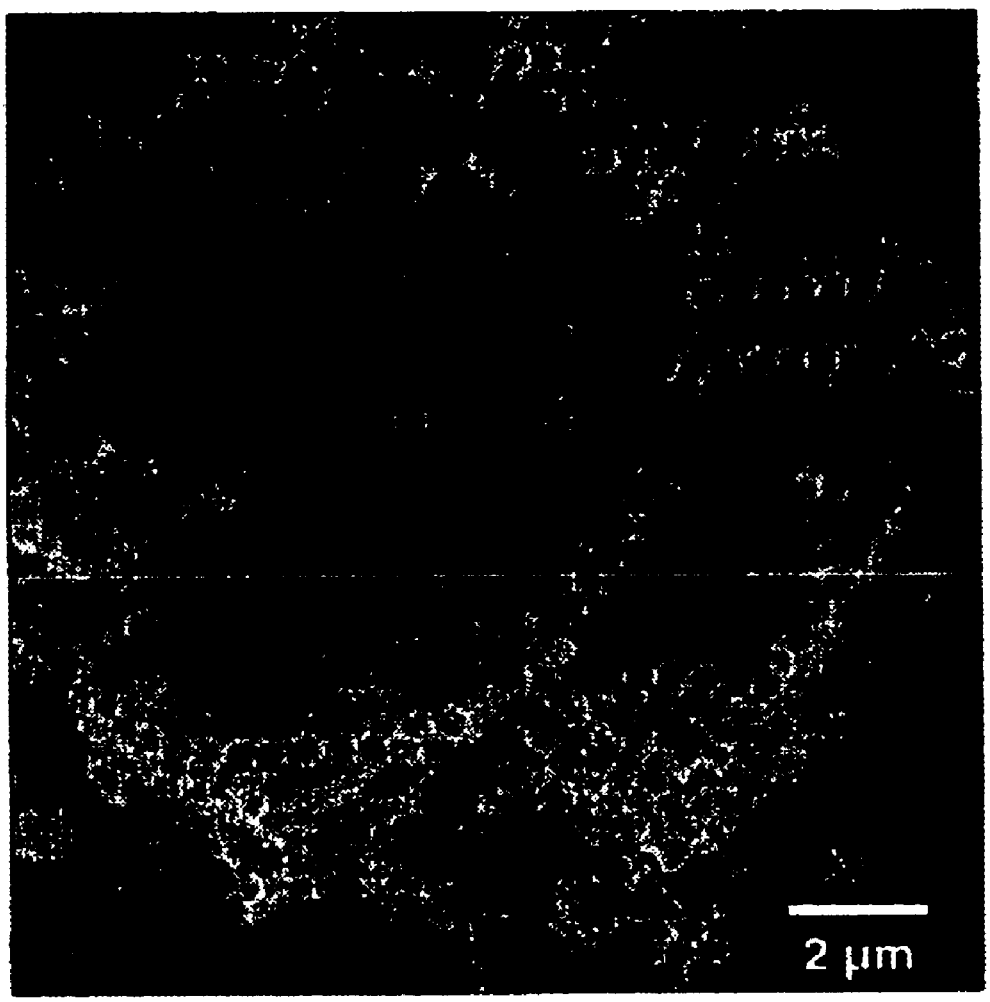
FIG. 9. SEM image of hybrid macroporous silica with vinyl functional groups synthesized from 5 TEOS:1 VTES precursors. The latex spheres were removed by extraction.

The polystyrene could be selectively removed by extraction from the macroporous silicates that were functionalized with vinyl or 2-cyanoethyl groups, leaving a large fraction of functional groups intact. For both compositions the macropores were well ordered, although particle sizes were typically smaller, e.g., a few $\mu$m, than for the pure oxides (FIG. 9). Periodic structures were obtained with VTES/TEOS mole ratios as high as 1:1.8. FT-IR spectra of the vinyl-modified macroporous silicates showed a peak at 1636 cm$^{-1}$ corresponding to the (C=C) stretching vibration of the vinyl group, an absorption at 1412 cm$^{-1}$ assigned to the vinyl (CH$_2$) in-plane deformation, at 975 cm$^{-1}$ for the (CH) out-of-plane deformation, and a peak at 1279 cm$^{-1}$ corresponding to the (Si—C) stretch. The cyanoethyl-modified silicate exhibited a (CN) stretching vibration at 2255 cm$^{-1}$. An additional peak at 1731 cm$^{-1}$ suggested that some conversion to a carboxylic ester occurred during the synthesis of this sample.

Efficiency of the Synthesis

Although scale-up should be possible, the present synthesis scale has been limited to tens of milligrams of ordered, template-free product and to macroporous crystal sizes mostly below one millimeter along each dimension. Several factors contributed to the small mass of product obtained at this stage. One was the intrinsic low density of these highly porous materials. Other factors were related to the present synthetic procedure. Although yields based on alkoxide imbibed in the colloidal latex crystals were reasonable (see, Removal of latex spheres), some extraneous alkoxide often passed through the template. For example, in case of the titania synthesis, only about 5 wt % to about 16 wt % of alkoxide adhered to the latex spheres, and about 12 wt % to about 23 wt % for zirconia. The amount adhering to the surface was a function of alkoxide dilution in alcohol. For titania and zirconia an optimal range was found between about 40 wt % to about 60 wt % alkoxide in alcohol. To make the synthesis economically more feasible, the unreacted alkoxide could be recycled in another synthesis. In terms of polystyrene spheres used, yields were typically about 40 mg to about 160 mg of calcined titania or zirconia product per gram of latex spheres. When the spheres were extracted, the polystyrene could be recycled for different applications, but the spherical shapes of the polymer were lost.

C. Conclusions

This synthesis of ordered macroporous products appeared to be quite general and applicable to many wall compositions. It was simple and based on readily available precursors. Although various void packing arrangements were possible, a diamond-like lattice was identified for the framework of several samples. Some control existed over the wall thickness and porosity. Control over the wall thickness may be important, for example, in adjusting the optical properties of photonic crystals. Ordered structures with multiple wall phases (e.g., amorphous or crystalline) might be achieved with certain compositions. However, phase transformations which occurred upon heating the sample after the latex sphere templates had been removed tended to result in the loss of an ordered or even a porous structure. The most ordered structures were obtained with oxide compositions that could be calcined well below a phase transition temperature (titania, zirconia, or yttria-stabilized zirconia) or with materials that formed amorphous wall phases (especially silica).

Example II

Synthesis of Zeolitic Structures

A. Experimental

1. Synthesis

Monodisperse polystyrene (PS) spheres (526±24 nm) were centrifuged at 1000 rpm (i.e., 100×g) for 12 hours to about 24 hours to form colloidal crystal templates. To avoid phase separation or melting of spheres before a hard silica skeleton was formed, a pseudo solid-state transformation was employed as developed by Shimizu et al., *Chem. Letters*, 403–404 (1996)), to convert preformed macroporous amorphous silica to silicalite. The macroporous silicalite was synthesized by mixing 98% TEOS (24 mmol) with a 1.0 M aqueous solution of TPAOH (12 mmol) in a polyethylene (PE) bottle containing 2.0 g of air-dried PS sphere templates, and shaking for 10 minutes. The resulting composite was allowed to harden overnight in the capped PE bottle.

The resulting solid was then transferred to a Teflon-lined autoclave, where it was heated under autogeneous pressure for 40 hours at 130° C. (no solvent was added at this stage). During this process, the amorphous silica transformed into silicalite in the presence of the TPA$^+$ structure directing agent. The organic components were removed by calcination in air at 525° C. for 7 hours to produce the macroporous silicalite.

2. Product Analysis

Figure 14:
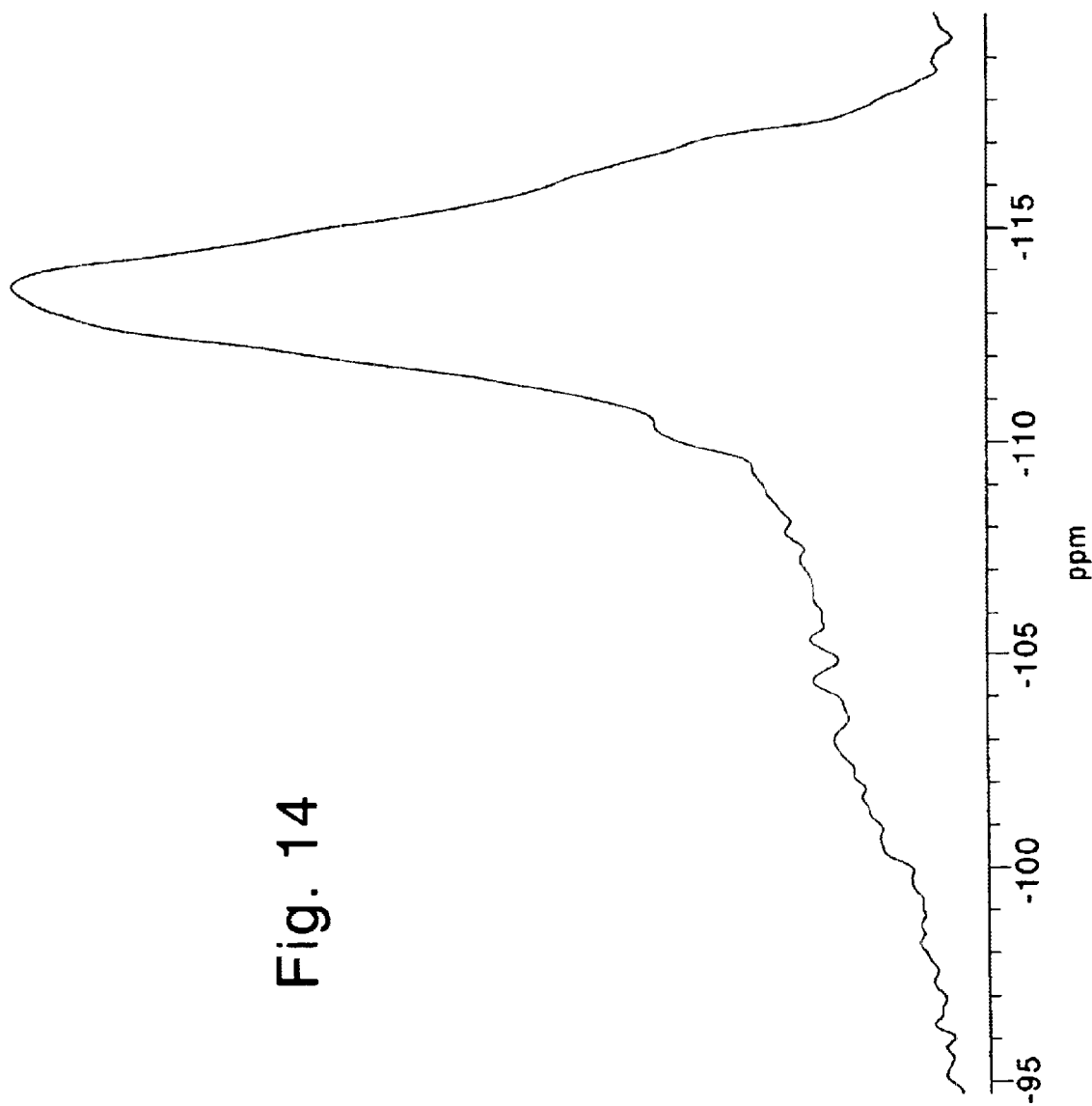
FIG. 14. $^{29}$Si MAS-NMR spectrum of calcined macroporous silicalite.

The $^{29}$Si MAS-NMR spectrum (FIG. 14) of macroporous silicalite showed a resonance centered at about 114 ppm vs. tetramethylsilane, which was attributed to Q$^4$ silicons of silicalite. The Q$^4$ envelope revealed shoulders due to the crystallographic inequivalent sites for silicon (Si) in the silicalite framework (Fyfe et al., *Nature*, 326:281–283 (1987)). Only a weak resonance (10% integrated intensity), attributable to Q$^3$ silicons from surface hydroxyl groups or to an amorphous component, was observed at about 104 ppm.

Figure 10:
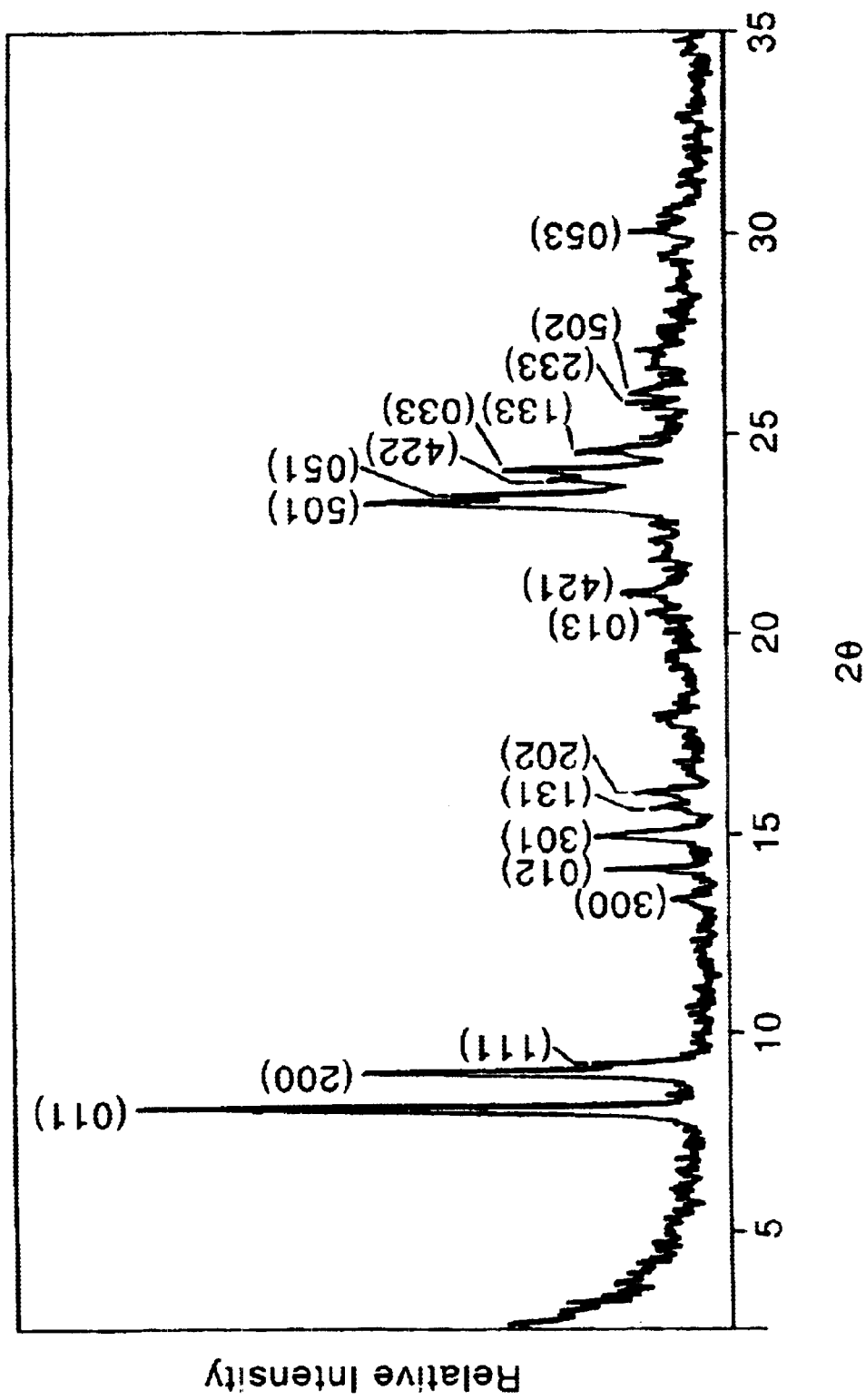
FIG. 10. PXRD pattern of macroporous silicalite; hkl assignments were based on PDF file no. 44-696.

The powder X-ray diffraction (PXRD) pattern of macroporous silicalite (FIG. 10) matched that of silicalite, with no evidence for another crystalline phase. The silicalite structure possesses two types of pores, straight channels along the [010] direction, formed by 10-membered rings (0.53 nm×0.56 nm), and sinusoidal channels along the [100] direction, also composed of 10-membered rings (0.51 nm×0.55 nm) (Meier et al., *Atlas of Zeolite Structure Types:* 2nd ed., (Butterworths: Boston, (1987)). The PXRD pattern was unchanged after the sample was refluxed in water for 13 hours, indicating that the zeolitic walls were hydrothermally more stable than, for example, mesoporous silica with the MCM-41 structure.

Figure 13:
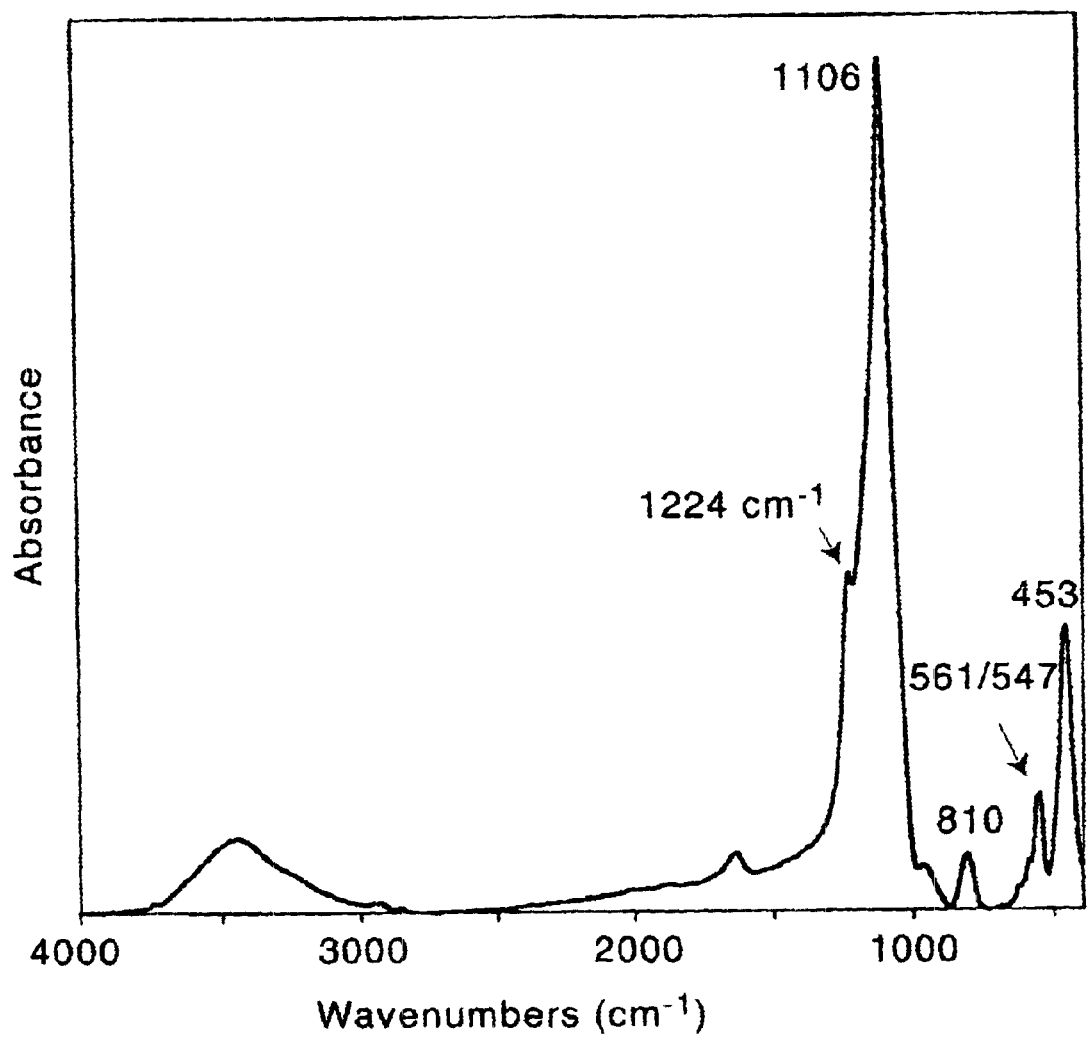
FIG. 13. FT-IR spectrum of calcined macroporous silicalite.

FT-IR spectra (FIG. 13) of the macroporous silicalites were used for screening of the product phases. Absorptions occurred at 1224 cm$^{-1}$, 1106 cm$^{-1}$ (asymmetric Si—O stretch), 810 cm$^{-1}$ (symmetric Si—O stretch), 561/547 cm$^{-1}$ (doublet) and 453 cm$^{-1}$ (Si—O bending vibration of internal silica tetrahedra (E. M. Flanigen, *Zeolite Chemistry and Catalysis*; J. A. Rabo, Ed.: Washington, D.C., 171:80–117 (1976)). The external asymmetric silicon-oxygen (Si—O) stretching vibration at 1224 cm$^{-1}$ is only found in zeolites containing five-membered rings (Jacobs et al., *Zeolites*, 1:161–168 (1981)). The band around 550 cm$^{-1}$ has been assigned to the asymmetric stretching mode in five-membered ring blocks. None of the calcined materials showed IR features of PS or the structure-directing molecules.

Figure 11:
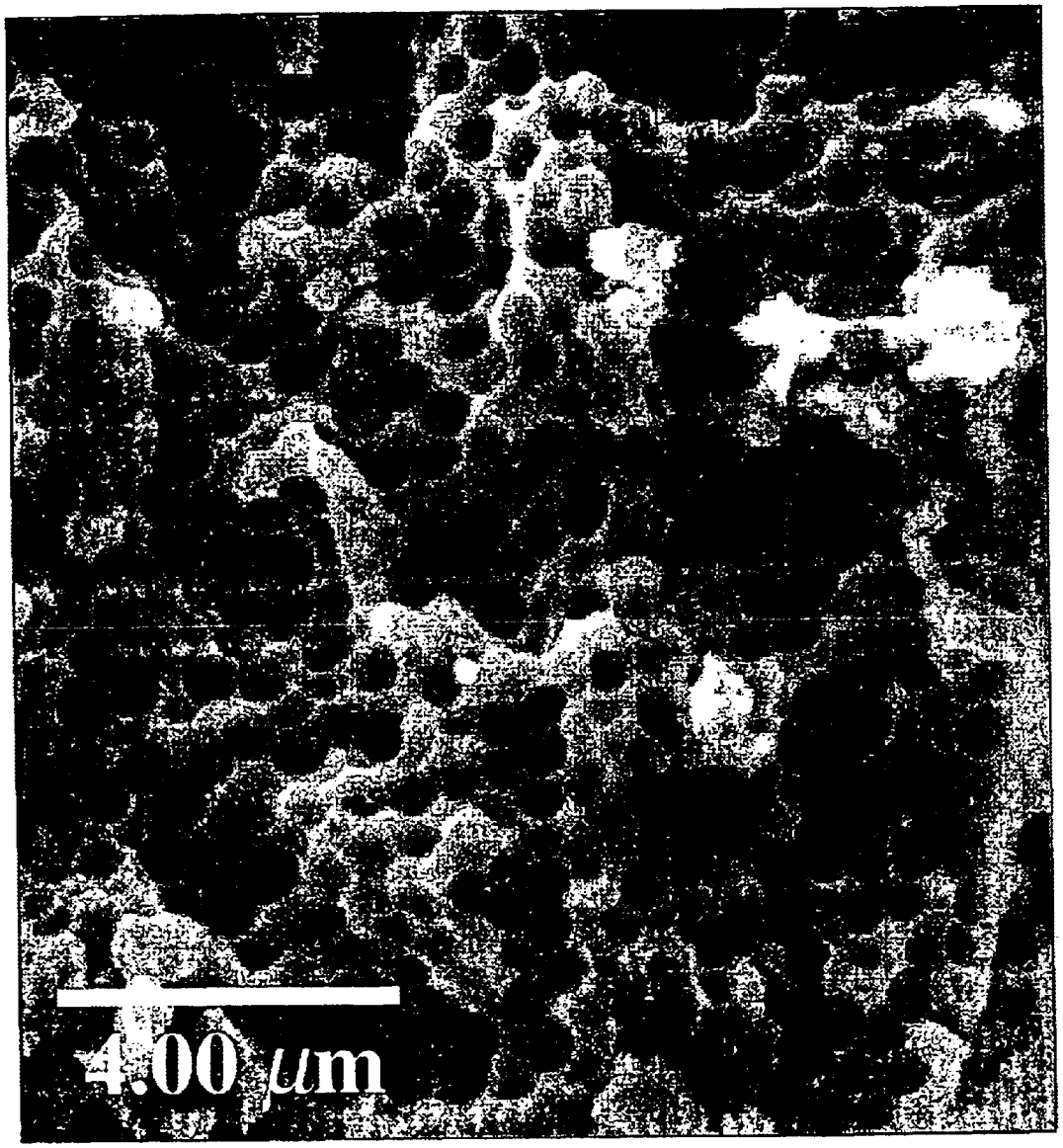
FIG. 11. SEM image of macroporous silicalite, showing the zeolitic walls around spheroidal voids that had been templated by polystyrene spheres.

The scanning electron micrograph (SEM) of macroporous silicalite (FIG. 11) showed spheroidal voids with relatively uniform diameters, about 250 nm±30 nm. Typical macroporous particles had dimensions between about 50 µm to about 275 µm along the sides. No silicalite crystals extraneous to the macroporous solid were observed by SEM. The average wall thickness estimated from SEM measurements was 113 nm (range: about 20 nm to about 220 nm). The values overlap with average silicalite domain sizes (about 50 nm to about 160 nm), estimated using the Scherrer equation and potassium bromide (KBr) powder as an internal reference. These wall thicknesses were smaller than those in typical ZSM-5 membranes (T. Bein, *Chem. Mater.*, 8:1636–1653 (1996)) resulting in short diffusion paths.

Mercury (Hg) porosimetry measurements confirmed that the macropores were accessible. The surface area due to pores greater than 3 nm was 52 square meters/gram (m$^2$/g) (corrected for sample compressibility), and the intrusion volume was 1.7 milliliters/gram (mL/g). The pore size distribution plot showed a bimodal distribution below 10 µm. Correlation with SEM indicated that a broad peak at 2.5 µm corresponded to cracks within particles, while a sharper peak around 174 nm correlated approximately with the templated macropores.

Figure 12:
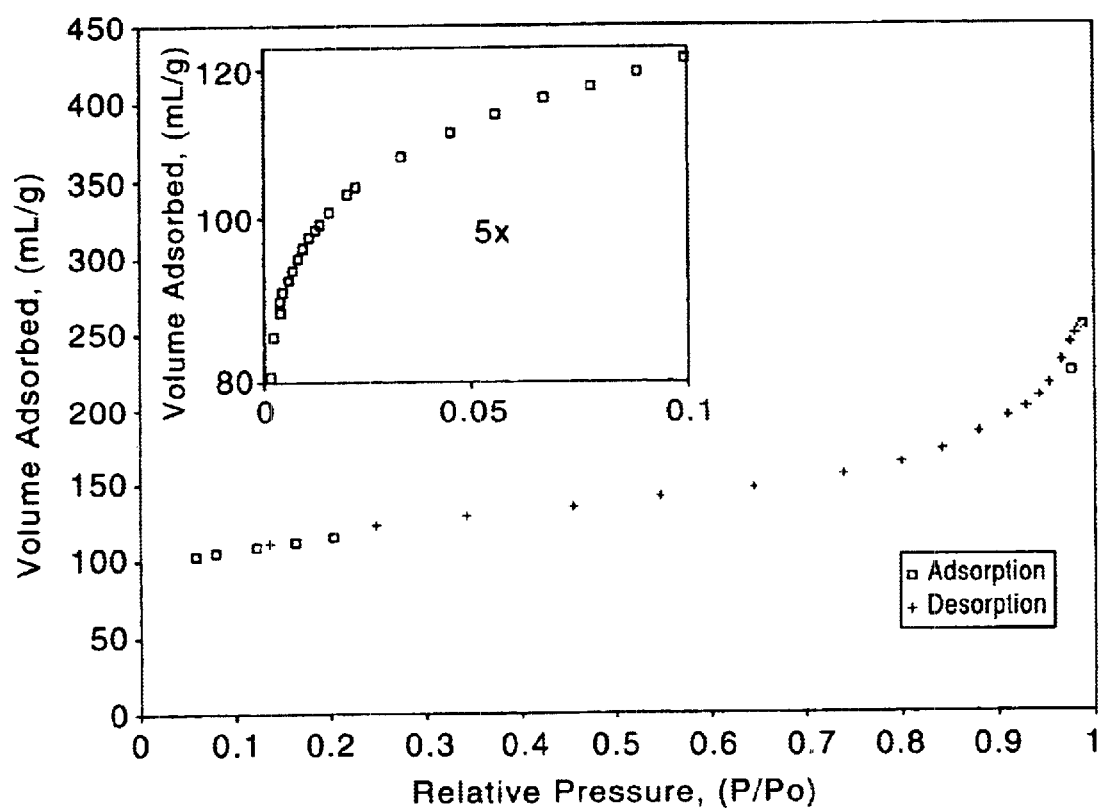
FIG. 12. Nitrogen adsorption/desorption isotherms of macroporous silicalite. The expanded adsorption isotherm (inset) demonstrates complete filling of the micropores at low partial pressures.

A type I nitrogen (N$_2$) adsorption/desorption isotherm (FIG. 12) was indicative of microporosity in the material. A steep rise in uptake, followed by a flat curve at low relative pressures corresponded to filling of micropores with N$_2$. The upward turn of the isotherm at higher relative pressures indicated filling of interparticle spaces. The total Brunauer-Emmett-Teller (BET) surface area of the sample was 421 m$^2$/g. Approximately half of this area was due to micropores, the other half was external to the micropores. A total single-point pore volume of 0.39 mL/g was measured. The calculated pore volume for pores greater than 2 nm was 0.30 mL/g (Barrett-Joyner-Halenda (BJH)) or 0.27 mL/g (Digisorb). Both BJH and Digisorb calculations were based on the Kelvin equation, assuming a statistical N$_2$ coverage. The observed difference of about 0.1 mL/g could be attributed to the microporous component of the sample with pores less than 2 nm. For highly crystalline, dehydrated ZSM-5 the pore volume is approximately 0.2 mL/g (Abrams, *J. Incl. Phenom. Mol. Recog. Chem.*, 21:1–46 (1995)). The sorption data therefore indicated that the macroporous material was composed of silicalite walls with about 50% crystallinity. The helium pycnometer density was 2.3 g/ml, which is a typical value for zeolites.

B. Results and Discussion

Bimodal pore structures involving zeolites are typically prepared by supporting zeolite crystallites on membranes or by forming zeolite composites with other porous matrices. A synthesis of a partially crystalline bimodal pore system with combined micro- and mesopores has recently been achieved by delaminating the layered zeolite MCM-22 (Corma et al., *Nature*, 396, 353–356 (1998)). Attempts to crystallize the walls of MCM-41 resulted in the formation of a material catalytic activity, but no crystalline features (Kloetstra, *Chem. Commun*, 23 2281–2282 (1997)). The walls in MCM-41 have a thickness of about 0.9–1.5 nm and can contain, at most, one layer of typical zeolite unit cells. Increasing the wall thickness would allow for multiple unit cells, thus increasing crystallinity, stability, and catalytic activity.

In Example I, above, it was demonstrated that a dual templating method could be used to produce highly periodic macroporous silica structures with amorphous walls that contained a broad distribution of mesopores. By pretreating the silica precursor (TEOS) with an aqueous mixture of cetyltrimethylammonium hydroxide and TPAOH, it was possible to tighten the mesopore size distribution significantly. However, the silica walls did not exhibit any crystalline domains.

Because the walls in the macroporous materials synthesized in Example I are typically tens of nanometers thick, the organic polymer colloidal crystal template method was used. However, the typical conditions used in Example I tend to form large wall particles that are only tenuously connected. Thus, to limit the growth of crystals within the voids between latex spheres, conditions similar to those used in the synthesis of zeolite nanophase materials were used. However, the higher temperatures used in the hydrothermal synthesis of zeolites (100–200° C.) exceeded the glass transition temperature of the latex spheres typically used (polystyrene whose Tg=104° C.). The dual templating method described in this example solved this problem.

This example demonstrates the preparation of silicates with bimodal pore structures of macropores (250 nm average diameter) that are surounded by microporous silicalite walls. The dual templating method described in Example I was used to control the hierarchichal pore system, with modification. The macropores were formed by using templates of monodisperse polystyrene spheres as templates. The porosity of the walls was controlled by mixing tetraethyl orthosilicate (TEOS) as the inorganic precursor with tetrapropylammonium hydroxide (TPAOH) as the structure-directing agent for silicalite walls (MFI structure). Thus, a pseudo-solid-state transformation of preformed macroporous amorphous silica to silicalite was used to avoid phase separation or melting of the spheres before a hard silica skeleton was formed.

Nitrogen adsorption/desorption isotherms confirmed the presence of microporosity within the prepared sample. Powder X-ray diffraction (PXRD), FT-IR, and $^{29}$Si MAS-NMR identified the microporous phase as silicalite (MFI), a zeolite having approximately 0.55 nm pores. SEM micrographs showed no distinct large silicalite crystals external to the macroporous solids. The PXRD pattern remained unchanged after the sample was refluxed in water for 13 hours, indicating that the zeolitic walls were more hydrothermally stable than, for example, mesoporous silica with the MCM-41 structure. These bimodal pore systems may find use as chromatographic supports and size-selective solid catalysts that combine the advantages of size-selectivity in the smaller pores and easy access through the macropores.

Example III

Synthesis of Periodic Nickel Oxides and Metallic Nickel

A. Experimental

1. Synthesis of Macroporous Nickel Oxide and Nickel Metal

Monodisperse polystyrene (PS) spheres (diameters: 421±50 nm and 660±30 nm) were synthesized and packed into colloidal crystals by centrifugation as described above. To prepare macroporous nickel oxide, 2 g nickel(II) acetate was dissolved in either 5 mL acetic acid or a mixture of 5 mL water and 5 mL ethanol at 60° C. After cooling to room temperature, any undissolved solid was removed by filtration. Centimeter-scale, close packed, colloidal polystyrene crystals (1 g) were soaked in the solution for about 3 minutes to about 5 minutes. Excess solution was removed from the impregnated colloidal crystals by vacuum filtration. The samples were dried at 60° C. for 2 hours.

The dried composites (nickel II acetate impregnated spheres) were soaked in 10 mL of a saturated solution of oxalic acid in ethanol (about 25 g to about 30 g oxalic acid in 100 mL ethanol) for 3–5 minutes.

After an additional vacuum filtration and drying step, the polystyrene spheres were removed by calcination in flowing air at about 360° C. to about 575° C. for 7 hours to 10 hours with a heating rate of 1° C./minute.

Macroporous Ni was prepared by heating macroporous NiO in flowing hydrogen ($H_2$), 8 psi at 300° C. for 5 hours with a heating rate of 1° C./minute, or by heating the nickel oxalate/PS composite in flowing nitrogen at 450° C. to 500° C. for 10 hours. Preparation of partially reduced samples containing both nickle oxide and Ni was possible by decreasing the reduction time or temperature, or by carrying out a fast calcination, for example, at 360° C. for 1 hour in fast flowing air.

2. Product Analysis

Electrochemical tests were performed in two electrode cells using 1 M aqueous KOH as the electrolyte and nickel pellets as both electrodes. Pellets were made by pressing a mixture of 10 wt % poly(vinylidene fluoride) binder with 90 wt % nickel to 1500 psi for 30 seconds. An SEM of the material indicated that a porous structure was still maintained. No carbon powder was needed to enhance the pellet conductivity. Impedance analysis was performed using a Solartron 1260 Impedance/Gain-Phase Analyzer along with a Solartron 1287 Electrochemical Interface. Other product characterization was carried out as described above.

B. Results and Discussion

In this method, nickel acetate was impregnated into a colloidal crystal template of polystyrene spheres, converted to nickel acetate upon precipitation by a solution of oxalic acid. The nickel oxalate scaffolding was converted to macroporous metallic nickel or nickel oxide, depending on the calcination conditions. The main decomposition products of nickel oxalate are Ni and $CO_2$, especially under flowing nitrogen. During calcination in air the nickel is quickly oxidized to NiO.

Upon evaluation by SEM (not shown), highly ordered air spheres and interconnected NiO walls formed a pore structure in three dimensions over a range of tens to hundreds of micrometers, giving the appearance of a "honeycomb." Average void diameters of 460 nm were obtained with 660 nm polystyrene spheres. The size of the voids and, as a result, the size of the windows between voids could be decreased by using smaller spheres. Carbon (0.1±0.4 wt %) and hydrogen (0±0.3 wt %) analyses of samples calcined between 360±575° C. indicated that the templates were completely removed during calcination and that the oxalate precursor had been fully decomposed. Due to their periodicity on a submicrometer scale, these particles exhibited opalescence in multiple colors.

A transmission electron micrograph (not shown) of macroporous NiO prepared at 360° C. illustrated that the walls were composed of fused grains with an average diameter of 6 nm. Larger grains (20 nm) are obtained when samples were calcined at 575° C. The presence of nickel and oxygen was confirmed by energy dispersive spectroscopy (EDS) under the electron microscope. Selected area electron diffraction (SAED) of the walls surrounding the periodic voids matched the crystalline hexagonal NiO phase of the bulk sample (PDF No. 44-1159), determined by powder X-ray diffraction (PXRD). No other crystalline phase was detected by PXRD. Type II nitrogen adsorption isotherms were observed, which are typical for macroporous adsorbents. Brunauer-Emmett-Teller (BET) surface areas of samples calcined in air between 360° C. and 575° C. for up to 10 hours ranged from 107 $m^2/g$ to 25 $m^2/g$, respectively. These surface areas are attributed mostly to the small particle size of the crystallites.

Macroporous metallic nickel (Ni) was obtained by heating macroporous nickle oxide (NiO) in a reducing atmosphere at 300° C. for 5 hours. Reduction under milder conditions resulted in macroporous Ni/NiO composite materials with controllable ratios of the metal and the semiconducting oxide. Based on the SEM (not shown), the porous nature and periodicity of the structure was largely maintained. The voids were entirely interconnected and periodic in all three dimensions, although defects were common. The TEM image (not shown) showed fused grains with an average size of about 50 nm. The larger grain size resulted in a reduced BET surface area of 5 $m^2/g$. Only Ni reflections were found in the PXRD pattern (PDF No. 4-850), and energy dispersive spectra (EDS) detected no oxygen.

Electrochemical analysis of the macroporous nickel was conducted to evaluate accessibility of the metal surface. In electrochemical tests employing two electrode cells, samples were cycled in a region showing no faradaic reactions at various sweep rates to remove any transients. Samples were stable for several hundred cycles. In a typical impedance spectrum observed for these materials (not shown), the transition to capacitive behavior occurs near 1 Hz. Further analysis of the capacitive region shows a capacitance of 2 F/g which agrees very well with the capacitance which can be estimated from the BET surface area (5 $m^2/g$) to be 1 F/g. This indicates that all of the powder surface area is electrochemically active and uniformly accessible at frequencies less than 1 Hz. The macroporous metal permits electrolyte to penetrate freely so that all of the surface are can be used, for example, in interfacial electrochemical reactions. In comparison, studies reporting hydrogen evolution experiments with Raney nickel showed that at most 1.5% of the surface was utilized in those samples.

In an alternate procedure, highly ordered macroporous Ni could be synthesized directly by heating the nickel oxalate/sphere template in a nitrogen atmosphere. This synthesis method resulted in smaller grains (a typical grain size of about 10 nm), although isolated larger nanocrystals were also observed. The periodicity of the voids was superior compared to the Ni sample prepared from nickle oxide reduction. The porous solid exhibited a Type II nitrogen adsorption isotherm with a BET surface area of 122 $m^2/g$. However, elemental analysis of this sample (39 wt.-% C, 1 wt.-% H suggest that much of this surface area can be attributed to occluded carbon, which was not oxidized in the absence of air.

Example IV

Synthesis of Periodic Macroporous Solids by Templated Salt Precipitation and Chemical Conversion A. Experimental 1. Materials Monodisperse polystyrene (PS) spheres were synthesized and packed into colloidal crystals by centrifugation as described above. Sphere diameters in various batches ranged from 620±10 nm to 760±25 nm. Manganese(II) acetate tetrahydrate (99%), cobalt(II) acetate tetrahydrate (98%), nickel(II) acetate tetrahydrate (98%), zinc oxide (99%), magnesium acetate tetrahydrate (99%), calcium acetate monohydrate (99%), chromium(VI) oxide (99%), iron(II) oxalate dihydrate (99%), and oxalic acid (98%) were obtained from Aldrich. AU the precursors were used as received without further purification.

2. Synthesis of 3DOM Metal Oxides or Carbonates

A metal acetate or another appropriate precursor salt (2 g) was dissolved in the amount of solvent or solvent mixture listed in Table 3. Centimeter-scale, close-packed, colloidal polystyrene crystals (approximately 2 g) were soaked in this solution for 3–5 minutes. Excess solution was removed from the impregnated colloidal crystals by vacuum filtration. The samples were dried at 65° C. for 1 hour. The dried composites were soaked in 10 mL of oxalic acid solution (approximately 30 g oxalic acid in 100 mL ethanol) for 5–10 min. Certain precursors, such as iron(III) oxalate and chromium(III) oxalate, which were soluble in water, could be used directly without the second precipitation step involving oxalic acid. For the Ca, Mg and Zn samples, the composites were annealed at 110–120° C. for 5–15 minutes before being soaked in the oxalic acid solution. After an additional vacuum filtration and drying step, the polystyrene spheres were removed by heating first in fast-flowing air (1.0 L/min in a 22 mm i.d. quartz tube) at 300° C. for 5 hours, and then calcining for 10 hours in slow-flowing air (0.1 L/min) at the calcination temperature listed in Table 3. All the heating rates were 1° C./minute.

3. Characterization of Product

Powder X-ray diffraction (XRD) studies were performed on a Siemens D5005 wide-angle XRD spectrometer with CuKα radiation. Average grain-size determinations were based on fitting the XRD patterns by using the JADE5 program. Thermogravimetric analysis (TGA) was performed with a Perkin-Elmer TGA-7 thermogravimetric analyzer attached to a PC via a TAC7/DX thermal controller. Differential scanning calorimetry (DSC) was carried out with a Perkin-Elmer 7 differential scanning calorimeter. A Hitachi S-800 scanning electron microscope (SEM) was used to examine the morphology of the samples. The $CaCO_3$, MgO, and ZnO samples, which are insulators with wide band-gaps, were coated with 5 nm Pt to reduce surface charging. The other semiconducting materials were not metal coated for SEM; no deleterious charging effects were observed. Transmission electron micrographs (TEM) were recorded on film with a Philips CM30 TEM operating at 300 kV with a $LaB_6$ filament. Samples for TEM were prepared by sonicating about 20 mg of the powder in 2 mL absolute ethanol for 30 min, and then depositing five drops of the suspension on a holey carbon grid. Micrographs were scanned on a Microtek ScanMaker III scanner for further analysis. Chemical analyses for carbon and hydrogen were carried out at Atlantic Microlab, Inc., Norcross, Ga. Nitrogen adsorption measurements were performed on a Micromeritics ASAP 2000 sorption analyzer. Prior to the sorption measurements, the samples were degassed under vacuum at 120° C. until a pressure $\leq 3$ μm Hg was obtained. Surface areas were calculated by the Brunauer-Emmett-Teller (BET) method; pore volumes and pore size distributions were determined from the adsorption isotherms by the Barrett-Joyner-Halenda (BJH) method. Mercury porosimetry measurements were carried out on a Micromeritics Poresizer 9320.

B. Results and Discussion

1. Preparation of the Latex Templated Precursor

FIG. 21 illustrates the preparation of the 3DOM metal oxides by the precipitation/chemical conversion method. In this work, ethanol and acetic acid were used as solvents to achieve good wetting of the closely packed polystyrene spheres, as were their mixtures with water, although water by itself did not wet the polystyrene spheres. The metal salt solution penetrated the interstitial spaces within the latex

TABLE 3

Experimental Conditions for the Synthesis of 3DOM Metal Oxides

| Element | Precursor | Solvent | Calc. Temp. | Product | PDF File | Applications[d] |
|---|---|---|---|---|---|---|
| Ni | $Ni(Ac)_2 \cdot 4H_2O$ | 10 mL $CH_3COOH$[a] | 360° C. | NiO, Bunsenite | 04-0835 | sensor, electrode |
| Co | $Co(Ac)_2 \cdot 4H_2O$ | 10 mL $CH_3COOH$[a] | 400° C. | $Co_3O_4$ | 42-1467 | sensor |
| Mn | $Mn(Ac)_2 \cdot 4H_2O$ | 10 ml EtOH | 450° C. | $Mn_2O_3$, Bixbyite-C | 41-1442 | N/A |
| Mg | $Mg(Ac)_2 \cdot 4H_2O$ | 5 mL EtOH/5 mL $H_2O$ | 500° C. | MgO, Periclase | 45-0946 | catalyst support |
| Ca | $Ca(Ac)_2 \cdot H_2O$ | 3 mL EtOH/7 mL $H_2O$[a] | 500° C. | $CaCO_3$, Calcite | 05-0586 | N/A |
| Zn | ZnO | 10 mL $CH_3COOH$/5 mL $H_2O$ | 400° C. | ZnO, Zincite | 36-1451 | sensor |
| Fe | $FeC_2O_4 \cdot 2H_2O$ | 5 mL EtOH/5 mL $H_2O/H_2O_2$[b] | 450° C. | $Fe_2O_3$, Hematite | 33-0664 | sensor |
| Cr | $CrO_3$ | 5 mL EtOH/5 mL $H_2O$[c] | 450° C. | $Cr_2O_3$, Eskolaite | 38-1479 | N/A |

[a]Undissolved solid removed by filtration.
[b]2 g oxalic acid was added to the mixture of $FeC_2O_4 \cdot 2H_2O$ in water. A 30% aqueous $H_2O_2$ solution was added dropwise until all solids were dissolved. Fe(II) oxalate was oxidized to Fe(III) oxalate by this procedure. Ethanol was added at this stage.
[c]Excess oxalic acid (6–8 g) was added to the mixture of $CrO_3$ in water. Ethanol was added after all solids had dissolved.
[d]Actual applications of the bulk oxides are listed. These may be potential applications for the 3DOM metal oxides.

sphere template by capillary forces, depositing the metal salt inside the template after solvent removal. As candidates for precursor metal salts, either acetates or nitrates of the metals used here had an acceptable solubility in the chosen solvents; however, they had low melting points. As a result, heating the metal acetate/PS composites resulted in their completely melting so that no more ordered structure remained. It is well known that many metal oxalates decompose directly before melting, but most of them are insoluble in water, ethanol or acetic acid. To combine the advantages of the two kinds of salts above, an in-situ chemical reaction scheme was designed by inducing oxalic acid solution into the metal acetate or nitrate-soaked PS template and transforming the low-melting, soluble salts to non-melting salts. Due to the relative strengths of their conjugate acids compared to oxalic acid, acetates are the preferred precursors over nitrates. A few soluble oxalates, such as iron(III) oxalate and chromium(III) oxalate, can be used directly as precursors since they already meet the requirements. It should be noted that the timing for the precipitation reaction is important to obtain 3DOM oxides of Mg, Ca and Zn. If the composites of acetates/PS are immersed in the oxalic acid solution too long, swelling can cause breakup of the latex sphere template and lead to lower macropore periodicity. To avoid this problem, the composites can be heated at 110–120° C. for 5–15 minutes. This annealing treatment results in partial fusing of the PS spheres and endows the colloidal crystal with enough strength to withstand breakup, while preserving open channels for the incorporation of oxalic acid.

Compared with methods involving sol-gel precursors, this synthetic procedure is less sensitive to atmospheric humidity. The precursors used here are typically much less expensive than alkoxide precursors. The method also permits formation of ordered structures for compositions that might be difficult to prepare by sol-gel methods if the corresponding alkoxide precursors have low solubility, or if commercial alkoxide precursors are not readily available. Since a large number of fluid-solid transformation reactions can be designed to meet the requirements, the varieties of 3DOM metal oxides can be expanded extensively, covering most metals in the periodic table.

2. Calcination of Latex Templates and Chemical Conversion

Figure 15:
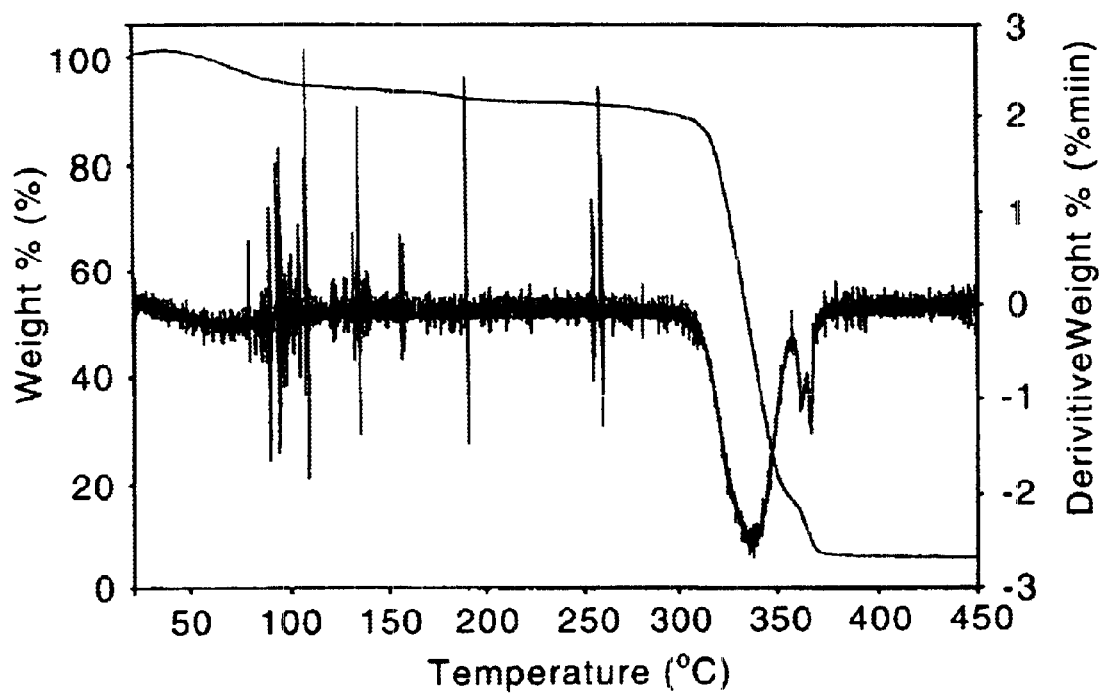
FIG. 15. TGA and derivative TGA curves of a PS/nickel oxalate composite in a flowing air atmosphere. The sample was heated from 25° C. to 450° C. at 1.0° C./min.

The latex templates were removed by calcination. It was found that the calcination conditions have an important effect on the quality of the macroporous product. During calcination, polystyrene undergoes several processes, such as glass transition, decomposition, and oxidation. The temperature ranges for these physical/chemical changes can be determined by DSC and TGA methods. Based on DSC measurements, the glass transition temperature for the polystyrene beads used as templates ranged from 93° C. to 108° C. The decomposition and oxidation temperatures are influenced by the heating history, such as heating rate and airflow. FIG. 15 shows the TGA curve for a PS/nickel oxalate composite calcined under flowing air from room temperature to 450° C. at a rate of 1° C./min. The weight decrease below 100° C. is assigned to loss of residual solvent. A slow and steady weight loss from 100–310° C. is attributed to dehydration of $NiC_2O_4 \cdot 2H_2O$. Above 310° C. the weight loss accelerates due to combustion of the polystyrene, a highly exothermic process that can be detrimental to the product structure if excessive bubbling results from the gas production. Thus, the removal of polystyrene should be performed at a temperature where weight loss occurs gradually; 300° C. was used in this work. The heating rate and airflow also have an effect on the removal of polystyrene, and need to be balanced. Slower heating rates (e.g., 2° C./min) facilitate more even melting and decomposition of polystyrene, thus avoiding excessive bubbling, which is observed at faster rates (e.g., 10° C./min). On the other hand, fast airflow aids the transport of by-products and accelerates the decomposition reaction. For example, in the preparation of 3DOM NiO, it takes 3 hours (h) to remove most polystyrene at 300° C. with an airflow of 1.0 L/min in a tube oven with an inner diameter of 22 mm. However, it takes more than 20 h when the rate of airflow is 0.1 L/min.

Concomitant with or subsequent to the removal of latex spheres, the metal oxalates undergo decomposition and oxidation reactions. It can be seen in FIG. 15 that a second set of weight loss peaks occurs at 360–370° C., which are more apparent in the derivative curve. These peaks are attributed to the decomposition of nickel oxalate to nickel with subsequent oxidation to nickel oxide. Depending on the radii of metal ions, the oxalates decomposed to metal carbonates, metal oxides or metals at temperatures ranging from 235–418° C. The decomposition reactions of various oxalates were described as follows:

$$MC_2O_4 \rightarrow MCO_3 + CO,$$

where M=Ca(II), Sr(II) and Ba(II)

$$MC_2O_4 \rightarrow MO + CO + CO_2,$$

where M=Mg(II), Mn(II), Fe(II), Zn(II) and Sn(II)

$$MC_2O_4 \rightarrow M + CO_2,$$

where M=Co(II), Ni(II), Cu(II), Cd(II) and Pb(II)

In an air atmosphere, Cu, Cd, Pb and Ni were oxidized further. In the present work, investigated the products of oxalates of Mn(II), Co(II), Ni(II), Zn(II), Mg(II), Ca(II), Fe(III) and Cr(III) were investigated after calcination at temperatures ranging from 360–450° C. for 1–10 hours. Carbon (0.1–0.4 wt %) and hydrogen (0–0.3%) analyses of these products indicated that the PS templates were nearly completely removed during calcination and that the oxalate precursors had been fully decomposed. Powder XRD studies showed that all samples were crystalline and could be identified as the single phases listed in Table 3. Grain-size analyses based on the fill width at half maximum (FWHM) of diagnostic XRD reflections showed that the oxides were composed of nanoscale grains with sizes ranging from 7–41 nm (Table 4).

TABLE 4

Microstructure, Surface Areas, and Porosity Data for 3DOM Metal Oxides

| Sample Composition | Particle[a] size (nm) | BET surface area (m²/g) | Pore volume[b] (mL/g) | Pore diameter[c] (nm) | Macropore diameter[d] (nm) | PS sphere diameter[d] (nm) | Wall thickness[d] (nm) |
|---|---|---|---|---|---|---|---|
| NiO | 10 ± 1 | 63 | 0.21 | 13 | 470 ± 10 | 660 ± 15 | 60 ± 10 |
| $Co_3O_4$ | 35 ± 6 | 25 | 0.13 | 26 | 500 ± 20 | 640 ± 25 | 55 ± 10 |
| $Mn_2O_3$ | 35 ± 3 | 20 | 0.10 | 21 | 380 ± 20 | 660 ± 15 | 70 ± 15 |

TABLE 4-continued

Microstructure, Surface Areas, and Porosity Data for 3DOM Metal Oxides

| Sample Composition | Particle[a] size (nm) | BET surface area (m$^2$/g) | Pore volume[b] (mL/g) | Pore diameter[c] (nm) | Macropore diameter[d] (nm) | PS sphere diameter[d] (nm) | Wall thickness[d] (nm) |
|---|---|---|---|---|---|---|---|
| MgO | 7 ± 1 | 35 | 0.19 | 26 | 455 ± 15 | 640 ± 10 | 60 ± 20 |
| CaCO$_3$ | 41 ± 8 | 13 | 0.03 | 14 | 560 ± 40 | 760 ± 25 | 140 ± 20 |
| ZnO | 21 ± 1 | 24 | 0.12 | 18 | 450 ± 15 | 760 ± 25 | 50 ± 15 |
| Fe$_2$O$_3$ | 23 ± 1 | 39 | 0.18 | 18 | 550 ± 20 | 760 ± 25 | 60 ± 10 |
| Cr$_2$O$_3$ | 30 ± 3 | 42 | 0.12 | 10 | 465 ± 15 | 760 ± 25 | 45 ± 15 |

[a]Particle sizes were calculated from XRD data.
[b]Average BJH pore volumes from the adsorption pore volume plots.
[c]Average BJH pore diameters from the adsorption pore volume plots.
[d]Macropore diameters, PS sphere diameters, and wall thicknesses were estimated from SEM images.

For the oxalates of Mn(II), Co(II), Ni(II) and Fe(II), the phases Mn$_2$O$_3$, Co$_3$O$_4$, NiO and Fe$_2$O$_3$ were obtained rather than lower oxidation-state products, because these oxalates were calcined in air, and any low oxidation-state decomposition products could be further oxidized in an exothermic reaction. Fast airflow tended to accelerate combustion of the samples and often destroyed the ordered structures. Therefore slow airflow was preferred during the final decomposition stage of oxalates.

The as-prepared 3DOM metal oxides (or carbonates) can be post-treated in different atmospheres to derive other 3DOM materials. For example, 3DOM metal nickel was obtained by reducing 3DOM NiO in a H$_2$ flow at 300° C. for 2 hours, as described above in Example III. It is also possible to prepare 3DOM calcium phosphate by treating 3DOM CaCO$_3$ with phosphoric acid. This versatility of calcination conditions and post-treatment will undoubtedly facilitate the preparation of novel 3DOM materials, providing a broad basis to study their structure-property relationships.

3. Characterization of the Inorganic 3DOM Structures

Figure 16:
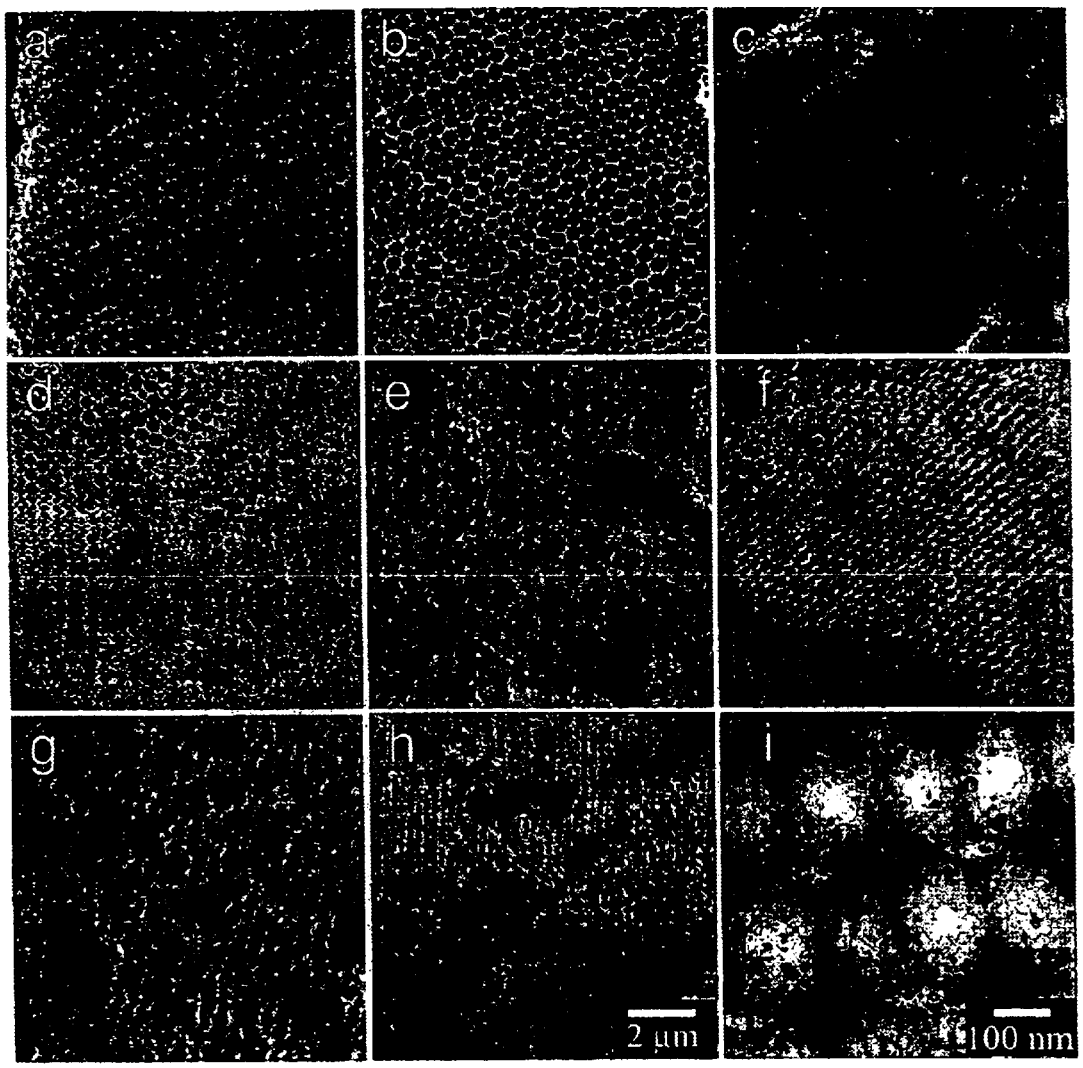
FIG. 16. SEM images of 3DOM metal oxides: (a) NiO, (b) $Co_3O_4$, (c) $Mn_2O_3$, (d) MgO, (e) $CaCO_3$, (f) ZnO, (g) $Fe_2O_3$, (h) $Cr_2O_3$. The scale is the same on all SEM images. (i) TEM image of the wall structure of 3DOM NiO synthesized at 360° C. for 10 hours.

FIG. 16(a–h) shows the scanning electron microscopy (SEM) images of 3DOM structures composed of NiO, Co$_3$O$_4$, Mn$_2$O$_3$, Fe$_2$O$_3$, Cr$_2$O$_3$, ZnO, MgO, and CaCO$_3$. Although the microscopic morphology differs between samples, it can be seen that the close packing order of the original PS sphere template is preserved in all calcined products. NiO and Co$_3$O$_4$ formed the most regular structures. Well-ordered air spheres and interconnected inorganic walls create a "honeycomb" pore structure in three dimensions. Although the structure is sometimes partially obscured by fragments and fractures on the surface, the next several layers are still visible in the images. Because the latex templates were fabricated by centrifugation resulting in polycrystalline colloidal crystals, the structures are subdivided into many ordered domains of macropore templates. The macropore units are often repeated for tens to hundreds of times without faults. Most of these domains have the typical fcc structure. Different views of the air sphere templates can be classified as corresponding to planes of the fcc structure, such as {111} or {011}. Given an ideal single phase colloidal crystal as template, one would expect that a perfect 3DOM structure can be prepared by this method under optimized conditions.

Besides originating from the template, defects may also arise from the synthesis procedure, depending on the material's composition and heating history. For example, the Mn$_2$O$_3$ structure (FIG. 16c) appears to undulate, containing many fault planes and cracks. It is believed that these defects are caused by the rapid production of CO$_2$ and CO during decomposition of manganese(II) oxalate, followed by exothermic oxidation of the CO. In the case of CaCO$_3$ (FIG. 16e), the walls of the macropores are thicker than those of the other metal oxides (see Table 4), due to the higher minimum calcination temperature (500° C.) required to obtain the carbonate by our method and the rapid growth of grains at this temperature. For Fe$_2$O$_3$ (FIG. 16g), the structural order is superior to that of a similar material prepared by the sol-gel method, since Fe$_2$O$_3$ tends to form larger wall crystallites and, hence, less ordered macroporous products when prepared from the alkoxide precursors.

The open nature of the structure was confirmed by mercury porosimetry, using macroporous nickel oxide as an example. A total intrusion volume of 1.1 mL/g was measured for pores greater than approximately 70 nm. Smaller pores, which require higher mercury pressures, could not be determined for this sample due to the fragile nature of the intricate metal oxide skeleton. From the measured bulk density of 0.57 g/mL, a porosity of at least 91% was calculated for macroporous nickel oxide. TGA measurements were employed as an alternate method to estimate the fraction of NiO left after calcination as compared to the maximum possible if all available interstitial space between close packed spheres (approximately 26 vol %) was filled with the NiC$_2$O$_4$.2H$_2$O precursor. With complete filling, the mass fraction of NiC$_2$O$_4$.2H$_2$O in the composite with PS spheres would be 44.9% (or 18.4% NiO), assuming densities of 1.05 g/cm$^3$ for PS and 2.44 g/cm$^3$ for NiC$_2$O$_4$.2H$_2$O. After correction for residual solvent, the NiO content determined by TGA was 7.1%, i.e., 0.39 of the theoretical maximum. Due to the higher density of NiO (6.67 g/cm$^3$) compared to the oxalate precursor, the final NiO framework occupied significantly less than the maximum interstitial volume.

The periodic spacing of the dielectric material making up the walls gives 3DOM materials a colored, opalescent appearance due to Bragg diffraction of visible light. Upon a review of bright-field optical micrographs of samples of MgO and NiO (not shown), the macroporous solids appear shiny and colored, even though bulk MgO is white and bulk NiO is greenish-black. Similar opalescence is observed in other 3DOM samples.

The pore sizes and wall thicknesses of these samples (Table 4) were estimated from SEM images, averaging a large number of data points. The macropores in these samples are relatively monodisperse and the pore diameters range from 380–560 nm, depending on the diameter of the templating PS spheres. All pore diameters are considerably smaller than the original latex spheres due to shrinkage during calcination. Differences in shrinkage can be attributed to different concentrations of precursors, synthetic conditions, and crystallization kinetics. Another noticeable aspect is the wall structure of the samples. The SEM results show that the wall thicknesses in these samples range from 45–140 nm, resulting from walls formed by nanoscale grains. FIG. 16(*i*) shows a TEM image of the wall structure of 3DOM NiO. The walls are composed of fused grains with an average diameter of 10–15 nm, in agreement with the XRD results.

Figure 17:
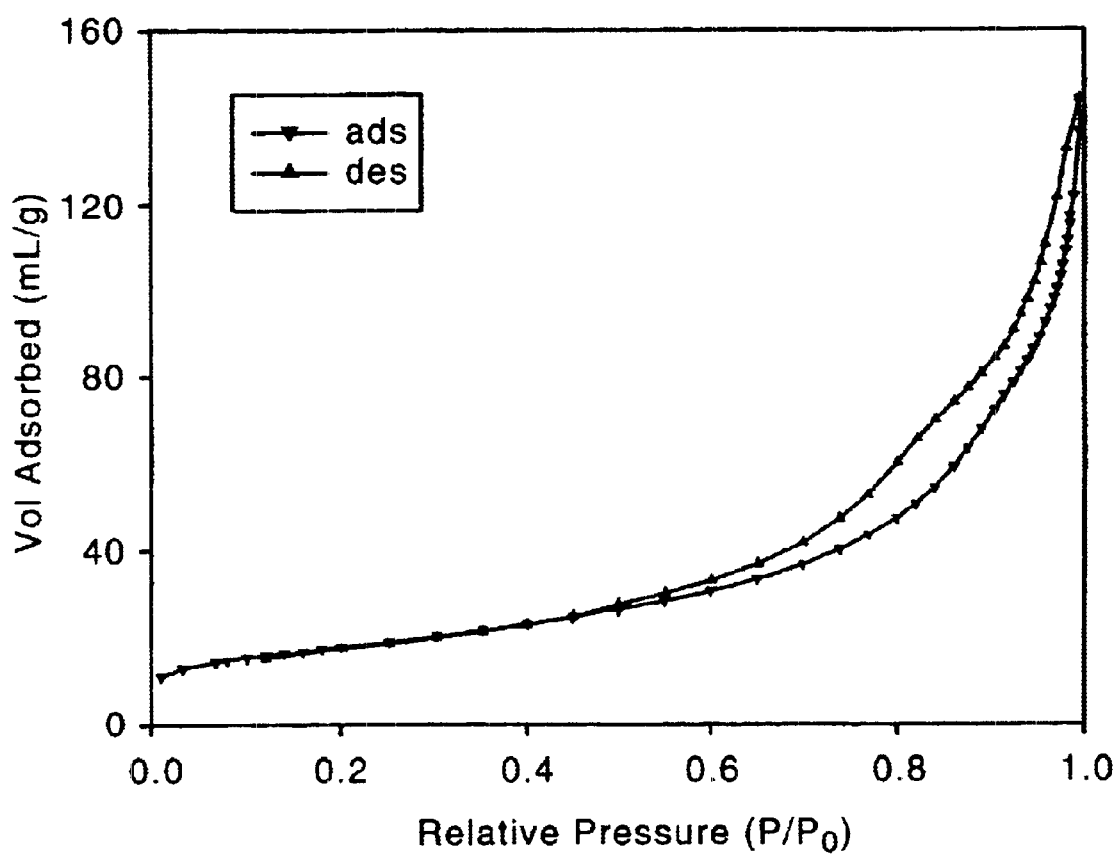
FIG. 17. Nitrogen adsorption isotherm of 3DOM NiO synthesized at 360° C. for 10 hours.

The wall structures were also characterized by nitrogen adsorption measurements. A Type II nitrogen adsorption was observed for all the samples. To take an example, FIG. 17 shows a typical isotherm plot for 3DOM NiO. The low pressure portion of the almost linear middle section of the isotherm, which is attributed to unrestricted monolayer-multilayer adsorption, suggests that the sample is a nonporous or macroporous adsorbent. However, the hysteresis loop over a range of high p/p°, which is associated with capillary condensation taking place in mesopores, indicates that textural mesopores exist within the wall structure. Associated with TEM results, these data suggest that a loose aggregation of nanoscale grains forms the matrix of the wall structure and produces the mesoporosity. The average BJH pore diameter and the BET surface areas of each sample were calculated and listed in Table 4. The average BJH pore diameter of these mesopores is about 10.5–25.6 nm, giving rise to BET surface areas between 12.8–63.1 $m^2/g$, depending on the material and calcination conditions. Therefore, these 3DOM materials possess a microstructure with dual porosity due to textural mesopores and larger, open macropores. The higher surface areas due to the mesopores are expected to influence interfacial processes.

Figure 18:
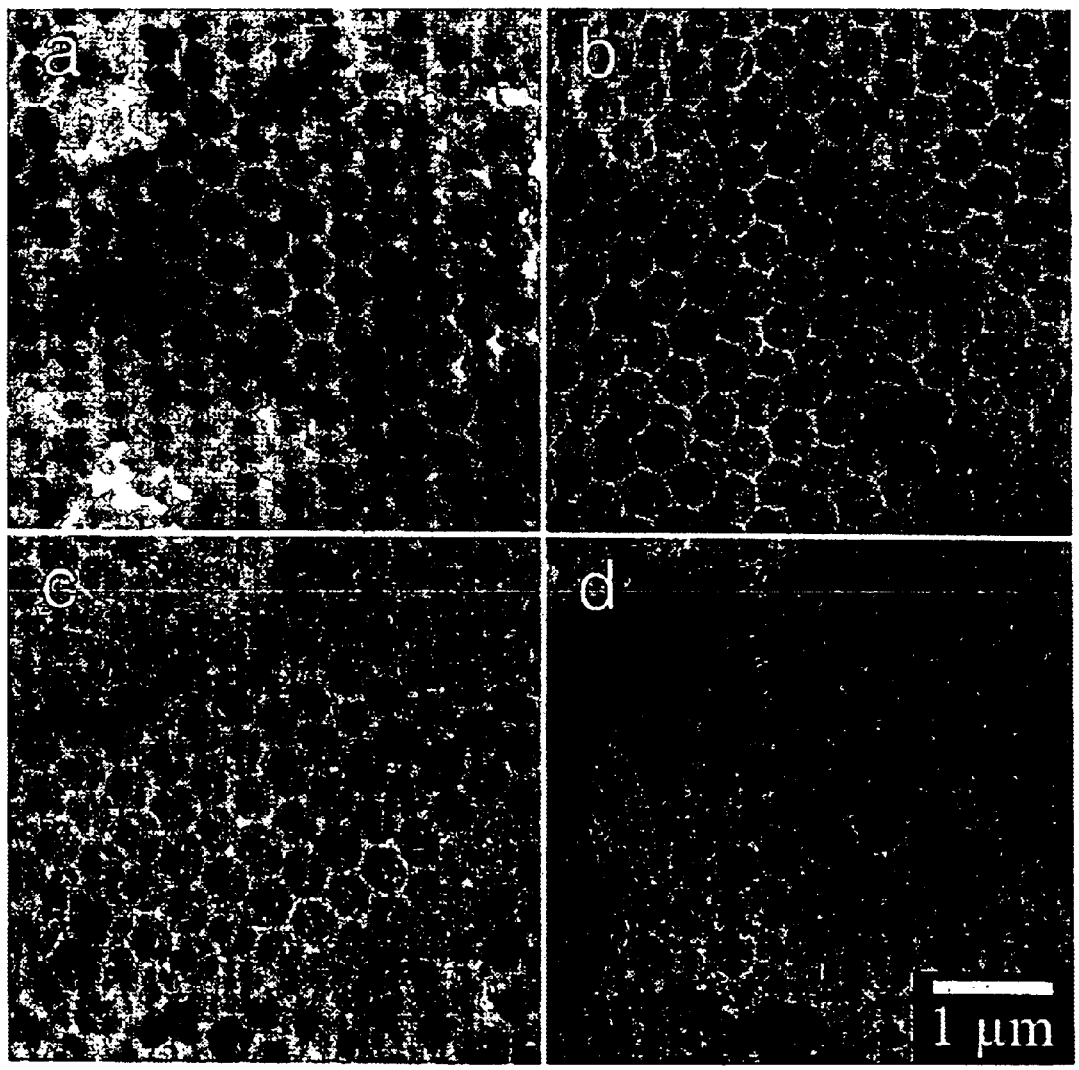
FIG. 18. SEM images of 3DOM NiO synthesized at different temperatures for 10 hours: (a) 360° C., (b) 450° C., (c) 550° C., (d) 600° C.
Figure 19:
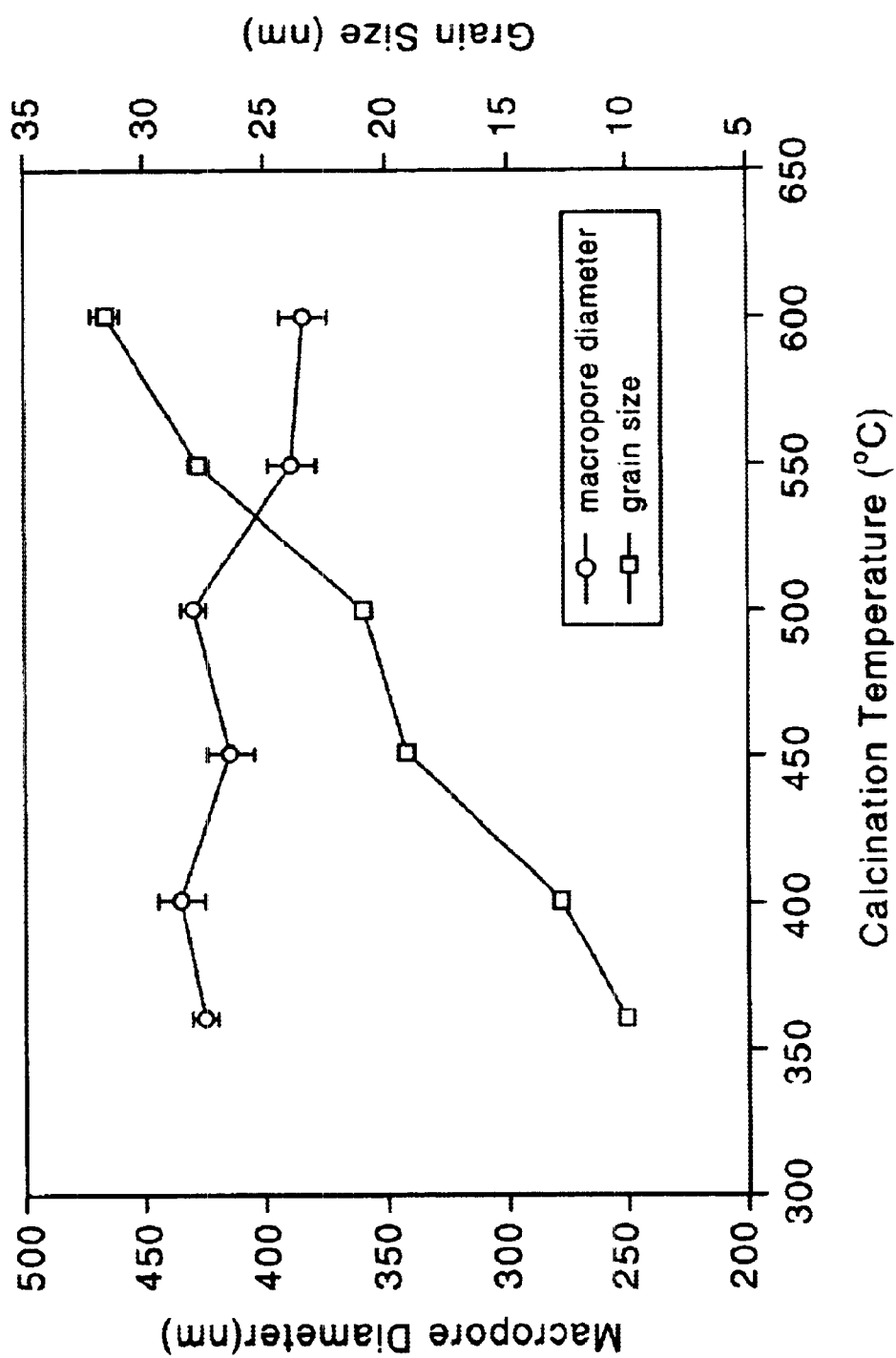
FIG. 19. Variation of the pore diameters and grain sizes of 3DOM NiO as a function of calcination temperature. The diameter of the templating PS spheres was 620±10 nm.

In many applications 3DOM structures with specific pore sizes are required. One obvious way of adjusting pore sizes is to select latex spheres with appropriate sizes, taking into account shrinkage. In addition, one can tailor pore sizes by controlling synthesis conditions. To investigate the effect of the calcination temperature, 3DOM NiO was synthesized at different temperatures for 10 hours. FIG. 18 shows the SEM images of some selected samples. From 360° C. to 500° C., the pore size remains virtually unchanged. When the temperature exceeds 500° C., the pore size tends to decrease. This result suggests that two kinds of shrinkage occur during the calcination: one is due to shrinkage of the latex template, which appears to be independent of temperature; the other is attributed to the shrinkage of the wall structure as grains grow, which can be adjusted by varying the temperature and heating time. FIG. 19 summarizes the dependence of pore size and grain size on the calcination temperature. The average grain size, based on powder XRD measurements, increases with temperature. As the grains become progressively larger, the apparent density of the wall tends to increase, causing a small amount of shrinkage of the macropores. At 550° C. individual grains are observed in the wall structure (FIG. 18*c*). At 600° C. evidence for sintering is observed, resulting in growth of the nodal points and roughening of the connecting bridges (FIG. 18*d*). With further sintering, the wall structure can collapse completely. The calcination time has a similar effect on the 3DOM structure as the temperature. By shortening the calcination time from 10 hours to 1 hour, the average grain size of 3DOM NiO synthesized at 600° C. is reduced from 35 nm to 20 nm, and the wall surface still looks smooth. Therefore, by carefully controlling the growth of grains, a refinement of the pore size can be achieved.

Figure 20:
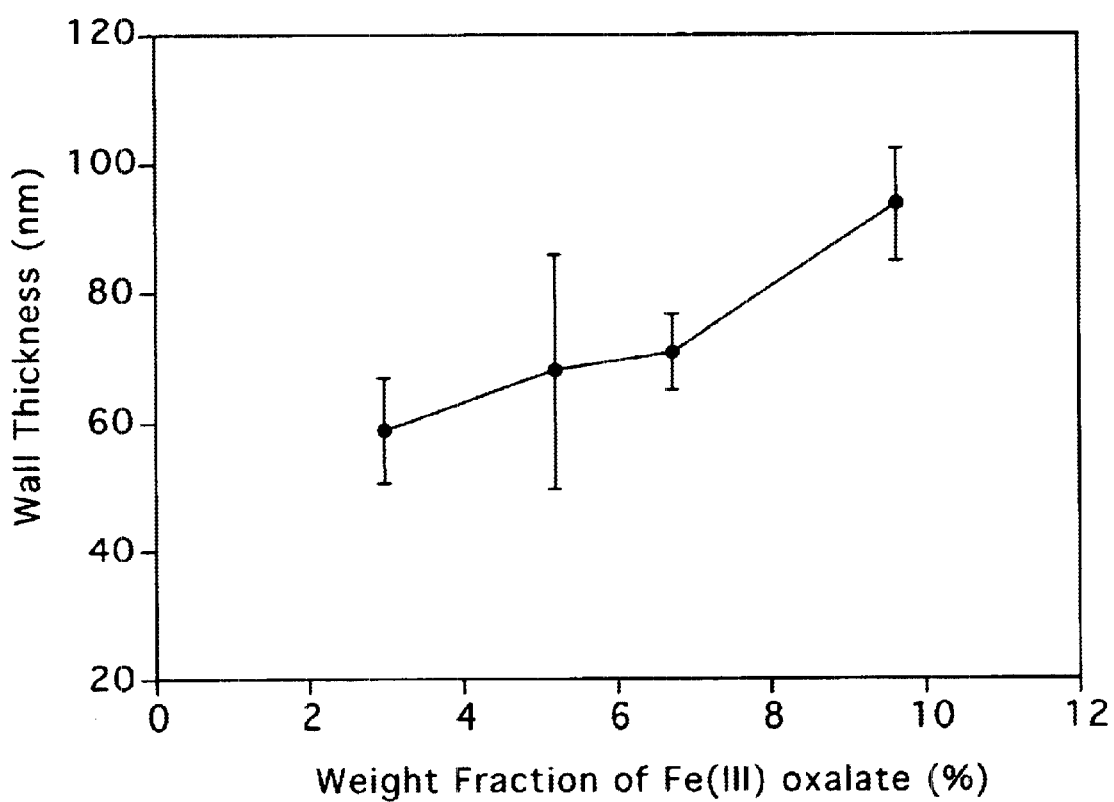
FIG. 20. Variation of the wall thickness of 3DOM $Fe_2O_3$ as a function of precursor (iron(III) oxalate) loading. All the samples were synthesized at 450° C. for 1 hour. Loading amounts were determined by TGA measurements. Weight fraction of iron(III) oxalate=(mass iron(III) oxalate)/(mass PS+mass iron(III) oxalate). Average wall thicknesses were estimated from SEM images based on multiple measurements.

The effect of the precursor concentration on 3DOM structures was also investigated. In this work, it was found that a minimal concentration of 0.5 M was necessary to fabricate a 3DOM structure. At lower concentrations, the solid skeleton did not have enough strength to support itself and collapsed during the removal of polystyrene. On the other hand, much higher concentrations of certain precursors made the solution too viscous to penetrate the latex template thoroughly. To increase the precursor loading, it is also possible to fill the template multiple times with solutions at low concentrations. Within the working range of concentrations, an increase in wall thickness was observed in a series of samples prepared with higher loadings of iron(III) oxalate, as shown in FIG. 20. A similar trend was seen in multiple self-consistent series. Thus, by controlling the synthesis conditions, it is possible to modify wall thicknesses and thereby the size of openings between adjacent voids.

C. Conclusions

A general method was presented to fabricate 3DOM metal oxides or carbonates based on templated precipitation and subsequent chemical conversion. Because it is based on readily available inorganic salts as precursors, the synthetic procedure is less sensitive to the atmosphere and less expensive, compared with sol-gel processes as described in Example I. The versatility of this synthetic procedure combined with various post-treatments, as described in Example III, can greatly expand the varieties of 3DOM compositions, which may now cover oxides (carbonates) of most metals in the periodic table. By controlling synthesis conditions, it is possible to tailor pore sizes and wall thicknesses according to specific requirements. These novel 3DOM dielectric or semiconducting materials have potential technological applications as catalysts, supports, sensors, wave guides, and porous electrodes or electrolytes.

Example V

Synthesis of Macroporous Alloys

A. Experimental

1. Synthesis

Colloidal crystals were prepared from uniformly sized poly(methyl methacrylate) (PMMA) spheres synthesized according to literature methods (Zou et al., *J. Polym. Sci. Part A: Polym. Chem.,* 30, 137–144 (1992)) and close-packed by gravity sedimentation or centrifugation. To prepare a 3DOM $Ni_xCo_{1-x}$ alloy, 0.008 mol nickel (II) acetate tetrahydrate and 0.008 mol cobalt (II) acetate tetrahydrate were dissolved in 20 mL methanol at 60° C. After cooling to room temperature, any undissolved solid was removed by filtration and a clear precursor solution was obtained. Centimeter-scale PMMA colloidal crystals (approximately 8 g) were soaked in this solution for 3 to 5 minutes. Excess solution was removed from the impregnated colloidal crystals by vacuum filtration. The samples were dried in air at room temperature for 1 hour. Then the dried composites were soaked in oxalic acid solution (approximately 3.6 g oxalic acid in 30 mL ethanol) for 2 minutes to form metal oxalate inside the PMMA colloidal crystals. After an additional vacuum filtration and drying step, the samples were processed at 400° C. in flowing $H_2$ (0.3 L/min in a 22 mm i.d. (inner diameter) quartz tube) for 1 hour (heating rate: 2° C./min).

2. Product Analysis

Carbon (0.52 wt %) and hydrogen (0.19 wt %) analyses of a calcined sample confirmed that most of the PMMA template was removed by this treatment and that the metal oxalates had been fully decomposed.

A typical SEM image (not shown) of the template-free macroporous product showed open voids and interconnected walls form a pore structure that was ordered over a range of tens of unit cells in three dimensions. Average void diameters of 200 nm were obtained with 410 nm PMMA spheres. Some cracks can be observed, which arise mainly from the large volume shrinkage and sintering during the template removal/chemical conversion processes. X-ray energy dispersive spectroscopy (EDS) covering one ordered colloidal crystal domain indicated a Ni:Co mol ratio in the walls of 0.69 bulk elemental analysis by ICP a Ni:Co ratio of 0.86. The walls are composed of fused grains with typical sizes between 20–50 nm (determined by TEM). The average grain size based on PXRD line widths, calculated by the Scherrer equation, was 33 nm. The PXRD pattern (not shown) of the product showed a single phase cubic structure (space group Fm3m), which matches the phase determined by selected-area electron diffraction (SAED) of an ordered area in the TEM. The average calculated lattice constant was 3.529(4) Å, which is between that of Ni (3.5238 Å) and Co (3.5447 Å), suggesting that the $Ni_xCo_{1-x}$ alloy is a solid solution. The 3DOM $Ni_xCo_{1-x}$ alloy exhibited a Type II nitrogen adsorption isotherm with a BET surface area of 9.9 $m^2$/g, which is attributed to the surface of fused, nonporous $Ni_xCo_{1-x}$ nanocrystallites composing the wall structure. Due to this large surface area, the fresh products were highly reactive, combusting upon rapid exposure to air even at room temperature. Combustion could be avoided by slow oxidation in a mixture of air (0.2 L/min) and nitrogen (1.0 L/min) for 30 min to passivate the sample surface. Passivated samples were air-stable over a period of weeks. Based on the total metals content from ICP analysis, the sample contained at most 4.8 wt % oxygen. However, no metal oxide reflections were observed in the PXRD pattern, indicating that the oxide layers were amorphous or very thin.

As another demonstration of a 3DOM alloy synthesis by the PMMA templating method, a $Mn_3Co_7$ alloy was also prepared from a stoichiometric mixture of manganese acetate and cobalt acetate precursors, using the same procedure as above. $Mn_3Co_7$ is an intermetallic compound alloy and has a crystal structure different from both Mn and Co. The PXRD pattern (not shown) showed reflections characteristic of the calcined $Mn_3Co_7$ alloy in agreement with the standard powder pattern (PDF No. 18-0407) and with SAED (not shown). Elemental analysis of the template-free product revealed 1.79 wt % C, 0.20 wt % H and a Mn:Co mol ratio of 0.39 (expected: 0.43). The SEM (not shown) showed that the $Mn_3CO_7$ alloy has a well-ordered porous structure with average void diameters of 210 nm obtained from 290 nm diameter PMMA spheres. This more ordered structure is probably due to reduced shrinkage and smaller grain sizes (ranging from 15 to 30 nm by TEM, not shown), caused by slower crystal growth kinetics of $Mn_3Co_7$. The smaller grain size leads to a larger BET surface area of 26.4 $m^2$/g.

B. Results and Discussion

It should be noted that the use of PMMA colloidal crystals as templates can significantly improve the periodicity and reduce the remaining carbon content of the resulting macroporous alloys/metals, relative to PS templates. The main reason for the improved performance of PMMA lies in its better thermal degradation character. PMMA decomposes by chain depolymerization, resulting in a gradual reduction in molecular weight and the production of monomer. By this mechanism, the yield of monomer can be as high as 100% in the temperature range between 170–300° C. In comparison, PS degrades to approximately 40% of monomer between 300–400° C. and leaves a larger amount of carbon after thermal treatment of the product in a non-oxidizing atmosphere (e.g., in a macroporous Ni/PS sample, 39 wt % C remained after heating in nitrogen at 450° C. for 10 hours, compared to 15 wt % C in a Ni/PMMA sample after 1 hour of heating). As a result of the milder conditions required to remove the PMMA template, smaller framework grain sizes and larger surface areas can be obtained. An additional benefit of using PMMA over PS spheres is the better penetration of the precursor solution in the PMMA colloidal crystal due to increased wettability. Consequently, fewer structural defects are introduced during the composite formation.

The PMMA templating method can be used to synthesize 3DOM alloys (as well as pure metals) with a wide range of simple and complex compositions, including ternary or higher multicomponent alloys. For example, a Ni/Fe/Co 3DOM alloy has been prepared by the same procedure. Besides providing a way of structuring metals on a nanometer scale and endowing them with relatively high surface areas, this technique allows one to tailor the physical properties (corrosion resistance, thermal properties, magnetic properties, etc.) of the 3DOM structures by changing the metallic composition of the alloy. As a result, the new class of alloys presented here may find applications as high performance catalysts, electrodes, supports and magnetic materials.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of forming an inorganic macroporous material, the method comprising:
   providing a sample of organic polymer particles having a particle size distribution of no greater than about 10%;
   forming a colloidal crystal template of the sample of organic polymer particles, the colloidal crystal template comprising a plurality of organic polymer particles and interstitial spaces therebetween;
   adding an inorganic precursor composition comprising a noncolloidal inorganic precursor to the colloidal crystal template such that the precursor composition permeates the interstitial spaces between the organic polymer particles;
   converting the noncolloidal inorganic precursor to a hardened inorganic framework; and
   removing the colloidal crystal template from the hardened inorganic framework to form a macroporous material, with the proviso that the macroporous material formed comprises macropores having an average pore size of less than 150 microns.

2. The method of claim 1 wherein converting the noncolloidal inorganic precursor and removing the organic polymer particles occur in one step.

3. The method of claim 2 wherein converting the noncolloidal inorganic precursor and removing the organic polymer particles occur during calcination.

4. The method of claim 1 wherein the organic polymer particles have a particle size distribution of no greater than about 5%.

5. The method of claim 4 wherein the macroporous structure is an ordered, three-dimensional structure.

6. The method of claim 1 wherein the organic polymer particles are spheres.

7. The method of claim 6 wherein the organic polymer particles comprise polystyrene, polymethyl methacrylate, or a fluorinated polymer.

8. The method of claim 1 wherein forming a colloidal crystal template of the organic polymer particles comprises ordering the particles by centrifugation, sedimentation, spin coating, evaporation, layer-by-layer growth, crystallization, or deposition in lithographic patterns.

9. The method of claim 1 further comprising drying the colloidal crystal template prior to adding an inorganic precursor composition.

10. The method of claim 1 further comprising fusing the organic polymer particles together.

11. The method of claim 10 wherein fusing comprises heating the particles.

12. The method of claim 1 wherein the inorganic precursor composition comprises one or more inorganic precursor dissolved in a solvent.

13. The method of claim 12 wherein the solvent comprises water, an alcohol, or a mixture thereof.

14. The method of claim 1 wherein the inorganic precursor composition comprises a low viscosity liquid.

15. The method of claim 1 wherein the inorganic precursor composition comprises an alkoxide.

16. The method of claim 15 wherein converting the inorganic precursor composition to a hardened inorganic framework comprises allowing the alkoxide to condense.

17. The method of claim 1 wherein the inorganic precursor composition comprises a salt.

18. The method of claim 17 wherein the salt is added to the colloidal crystal template in a solution and subsequently caused to precipitate out of solution in the interstitial spaces.

19. The method of claim 1 wherein removing the colloidal crystal template from the hardened inorganic framework comprises extracting or calcining the organic polymer particles.

20. The method of claim 1 wherein the inorganic precursor composition comprises a metal salt or metal alkoxide.

21. The method of claim 1 wherein the macroporous material comprises a carbonate, an oxide or other chalcogenide, a phosphate, a silicate, a metal, or a metal alloy.

22. The method of claim 21 wherein the macroporous material comprises a zeolite analogue.

23. The method of claim 1 wherein the macroporous material comprises a hybrid inorganic/organic material.

24. The method of claim 23 wherein the hybrid inorganic/organic material is an organic silicate.

25. The method of claim 1 wherein the inorganic precursor composition includes a structure-directing agent.

26. The method of claim 1 wherein the inorganic precursor composition includes a surfactant.

27. The method of claim 1 wherein the macroporous material is further treated to chemically convert the framework.

28. The method of claim 27 wherein the framework is converted from a metal oxide to a metal.

29. A method of forming an inorganic macroporous material, the method comprising:

providing a sample of organic polymer particles;

forming a colloidal crystal template of the sample of organic polymer particles, the colloidal crystal template comprising a plurality of organic polymer particles and interstitial spaces therebetween;

adding an inorganic precursor composition comprising a noncolloidal inorganic precursor to the colloidal crystal template such that the precursor composition permeates the interstitial spaces between the organic polymer particles;

converting the noncolloidal inorganic precursor to a hardened inorganic framework; and removing the colloidal crystal template from the hardened inorganic framework to form a macroporous material, wherein the macroporous material comprises a zeolite analogue, and wherein the zeolite analogue is a silicalite.

30. A method of forming an inorganic macroporous material, the method comprising:

providing a sample of organic polymer particles;

forming a colloidal crystal template of the sample of organic polymer particles, the colloidal crystal template comprising a plurality of organic polymer particles and interstitial spaces therebetween;

adding an inorganic precursor composition comprising a noncolloidal inorganic precursor and a structure directing agent to the colloidal crystal template such that the precursor composition permeates the interstitial spaces between the organic polymer particles, wherein the structure-directing agent is tetrapropylammonium hydroxide or tetramethylammonium hydroxide;

converting the noncolloidal inorganic precursor to a hardened inorganic framework; and removing the colloidal crystal template from the hardened inorganic framework to form a macroporous material with the proviso that the macroporous material formed comprises macropores having an average pore size of less than 150 microns.

31. A method of forming an inorganic macroporous material, the method comprising:

providing a sample of organic polymer particles having a particle size distribution of no greater than about 10%;

forming a colloidal crystal template of the sample of organic polymer particles, the colloidal crystal template comprising a plurality of organic polymer particles and interstitial spaces therebetween;

adding an inorganic precursor composition comprising a noncolloidal inorganic precursor comprising an alkoxide to the colloidal crystal template in a manner to allow the inorganic precursor composition to permeate the interstitial spaces between the organic polymer particles;

condensing the alkoxide to form a hardened inorganic framework; and removing the colloidal crystal template from the hardened inorganic framework to form a macroporous material, with the proviso that the macroporous material formed comprises macropores having an average pore size of less than 150 microns.

32. A method of forming an inorganic macroporous material, the method comprising:

providing a sample of organic polymer particles having a particle size distribution of no greater than about 10%;

forming a colloidal crystal template of the sample of organic polymer particles, the colloidal crystal template comprising a plurality of organic polymer particles and interstitial spaces therebetween;

adding a salt solution to the colloidal crystal template in a manner to allow the salt solution to permeate the interstitial spaces between the organic polymer particles;

precipitating the salt out of solution within the interstitial spaces; and removing the colloidal crystal template from the hardened inorganic framework to form a macroporous material, with the proviso that the macroporous material formed comprises macropores having an average pore size of less than 150 microns.

33. The method of claim 32 further including converting the precipitated salt to a hardened inorganic framework prior to removing the organic polymer particles.

34. A method of forming an inorganic macroporous material, the method comprising:

providing a sample of organic polymer particles;

forming a colloidal crystal template of the sample of organic polymer particles, the colloidal crystal template comprising a plurality of organic polymer particles and interstitial spaces therebetween;

adding an inorganic precursor composition comprising a noncolloidal inorganic precursor to the colloidal crystal template such that the precursor composition permeates the interstitial spaces between the organic polymer particles;

converting the noncolloidal inorganic precursor to a hardened inorganic framework; and removing the colloidal crystal template from the hardened inorganic framework to form a macroporous material, with the proviso that the macroporous material formed comprises macropores having an average pore size of greater than about 50 nm and less than about 10 microns.

35. The method of claim 34 wherein the organic polymer particles having a particle size distribution of no greater than about 10%.

36. A method of forming an inorganic macroporous material, the method comprising:

providing a sample of organic polymer particles;

forming a colloidal crystal template of the sample of organic polymer particles, the colloidal crystal template comprising a plurality of organic polymer particles and interstitial spaces therebetween;

adding an inorganic precursor composition comprising a noncolloidal inorganic precursor and a structure directing agent to the colloidal crystal template such that the precursor composition permeates the interstitial spaces between the organic polymer particles, wherein the structure-directing agent is tetrapropylammonium hydroxide or tetramethylammonium hydroxide;

converting the noncolloidal inorganic precursor to a hardened inorganic framework; and removing the colloidal crystal template from the hardened inorganic framework to form a macroporous material, with the proviso that the macroporous material formed comprises macropores having an average pore site of greater than about 50 nm and less than about 10 microns.

37. A method of forming an inorganic macroporous material, the method comprising:

providing a sample of organic polymer particles;

forming a colloidal crystal template of the sample of organic polymer particles, the colloidal crystal template comprising a plurality of organic polymer particles and interstitial spaces therebetween;

adding an inorganic precursor composition comprising a noncolloidal inorganic precursor comprising an alkoxide to the colloidal crystal template in a manner to allow the inorganic precursor composition to permeate the interstitial spaces between the organic polymer particles;

condensing the alkoxide to form a hardened inorganic framework; and removing the colloidal crystal template from the hardened inorganic framework to form a macroporous material, with the proviso that the macroporous material formed comprises macropores having an average pore size of greater than about 50 nm and less than about 10 microns.

38. The method of claim 37 wherein the organic polymer particles having a particle size distribution of no greater than about 10%.

39. A method of forming an inorganic macroporous material, the method comprising:

providing a sample of organic polymer particles;

forming a colloidal crystal template of the sample of organic polymer particles, the colloidal crystal template comprising a plurality of organic polymer particles and interstitial spaces therebetween;

adding a salt solution to the colloidal crystal template in a manner to allow the salt solution to permeate the interstitial spaces between the organic polymer particles;

precipitating the salt out of solution within the interstitial spaces; and removing the colloidal crystal template from the hardened inorganic framework to form a macroporous material, with the proviso that the macroporous material formed comprises macropores having an average pore size of greater than about 50 nm and less than about 10 microns.

40. The method of claim 39 wherein the organic polymer particles having a particle size distribution of no greater than about 10%.

* * * * *

UNITED STATES PATENT AND TRADEMARK OFFICE
CERTIFICATE OF CORRECTION

PATENT NO. : 6,680,013 B1
DATED : January 20, 2004
INVENTOR(S) : Stein et al.

It is certified that error appears in the above-identified patent and that said Letters Patent is hereby corrected as shown below:

Column 1,
Line 12, after "9809364" insert -- and 8721551 (Center for Interfacial Engineering) --

Column 7,
Line 36, delete "Furasawa" and insert -- Furusawa --
Line 49, delete "297 304" and insert -- 297-304 --

Column 21,
Line 28, after "psia" insert -- . --

Column 28,
Line 11, delete "23" and insert -- 23: --

Column 31,
Line 22, delete "AU" and insert -- All --

Signed and Sealed this

Nineteenth Day of April, 2005

JON W. DUDAS
*Director of the United States Patent and Trademark Office*